United States Patent
Sim et al.

(10) Patent No.: US 11,199,964 B2
(45) Date of Patent: Dec. 14, 2021

(54) FOLDABLE ELECTRONIC DEVICE AND METHOD FOR CONTROLLING SCREEN BY USING GESTURE

(71) Applicant: Samsung Electronics Co., Ltd., Gyeonggi-do (KR)

(72) Inventors: Hye Jin Sim, Gyeonggi-do (KR); Bo Eun Song, Gyeonggi-do (KR); Joon Hwan Kim, Gyeonggi-do (KR); Hyun Kyoung Kim, Gyeonggi-do (KR); Min Wook Na, Gyeonggi-do (KR); Ji Won Yoo, Gyeonggi-do (KR); Hyun Do Lee, Gyeonggi-do (KR); Yun Sung Jung, Gyeonggi-do (KR); Hye Mi Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/961,970

(22) PCT Filed: Nov. 6, 2018

(86) PCT No.: PCT/KR2018/013347
§ 371 (c)(1),
(2) Date: Jul. 14, 2020

(87) PCT Pub. No.: WO2019/151618
PCT Pub. Date: Aug. 8, 2019

(65) Prior Publication Data
US 2021/0089202 A1   Mar. 25, 2021

(30) Foreign Application Priority Data
Jan. 30, 2018   (KR) .................. 10-2018-0011272

(51) Int. Cl.
*G06F 3/0488*   (2013.01)
*G09G 3/00*   (2006.01)
(Continued)

(52) U.S. Cl.
CPC ........ *G06F 3/04883* (2013.01); *G06F 3/0416* (2013.01); *G06F 3/0483* (2013.01);
(Continued)

(58) Field of Classification Search
CPC .. G06F 3/04883; G06F 3/0416; G06F 3/0483; G06F 3/0485; G06F 2203/04102;
(Continued)

(56) References Cited

U.S. PATENT DOCUMENTS

| | | |
|---|---|---|
| 8,448,071 B2 | 5/2013 | Ahn et al. |
| 9,304,540 B2 | 4/2016 | Cassar |

(Continued)

FOREIGN PATENT DOCUMENTS

| | | |
|---|---|---|
| EP | 3322159 A1 | 5/2018 |
| JP | 2011-70474 A | 4/2011 |

(Continued)

OTHER PUBLICATIONS

European Search Report dated Jan. 13, 2021.

*Primary Examiner* — Richard J Hong
(74) *Attorney, Agent, or Firm* — Cha & Reiter, LLC

(57) ABSTRACT

An electronic device according to various embodiments may comprise: a first housing including a first surface and a second surface facing away from the first surface; a second housing including a third surface and a fourth surface facing away from the third surface; a folding part pivotably connecting a side surface of the first housing and a side surface of the second housing facing the side surface of the first housing; a flexible display disposed on the first and third surfaces across the folding part, having a first area corre- (Continued)

sponding to the first surface and a second area corresponding to the third surface; and a processor.

15 Claims, 21 Drawing Sheets

(51) Int. Cl.
G06F 3/041 (2006.01)
G06F 3/0483 (2013.01)
G06F 3/0485 (2013.01)
G09G 5/14 (2006.01)
G09G 5/397 (2006.01)

(52) U.S. Cl.
CPC .......... *G06F 3/0485* (2013.01); *G09G 3/035* (2020.08); *G09G 5/14* (2013.01); *G09G 5/397* (2013.01); *G06F 2203/04102* (2013.01); *G06F 2203/04803* (2013.01); *G09G 2330/021* (2013.01); *G09G 2340/12* (2013.01); *G09G 2354/00* (2013.01); *G09G 2380/02* (2013.01)

(58) Field of Classification Search
CPC ......... G06F 2203/04803; G06F 1/1677; G06F 3/04817; G06F 1/1647; G06F 3/1446; G06F 3/0488; G06F 3/04847; G06F 1/1616; G09G 3/035; G09G 5/14; G09G 5/397; G09G 2330/021; G09G 2340/12; G09G 2354/00; G09G 2380/02; G09F 9/301
See application file for complete search history.

(56) References Cited

U.S. PATENT DOCUMENTS

| | | | |
|---|---|---|---|
| 2011/0074717 A1 | 3/2011 | Yamashita | |
| 2011/0175930 A1* | 7/2011 | Hwang | G06F 3/0488 345/629 |
| 2013/0332886 A1* | 12/2013 | Cranfill | G06F 3/04817 715/835 |
| 2014/0218321 A1 | 8/2014 | Lee et al. | |
| 2014/0250391 A1* | 9/2014 | Jong | G06F 3/04883 715/763 |
| 2014/0375596 A1* | 12/2014 | Kim | G06F 3/1446 345/174 |
| 2015/0022561 A1* | 1/2015 | Ikeda | G09F 9/301 345/690 |
| 2015/0130738 A1 | 5/2015 | Park | |
| 2015/0234507 A1* | 8/2015 | Chun | G06F 1/1616 345/173 |
| 2015/0301665 A1* | 10/2015 | Kim | G06F 1/1647 345/173 |
| 2016/0085319 A1* | 3/2016 | Kim | G06F 3/04847 345/156 |
| 2017/0045996 A1 | 2/2017 | Ka et al. | |
| 2018/0011676 A1 | 1/2018 | Han et al. | |
| 2018/0198896 A1 | 7/2018 | Kang et al. | |
| 2018/0331991 A1 | 11/2018 | Kim et al. | |
| 2019/0012000 A1* | 1/2019 | Cavallaro | G06F 1/1677 |
| 2019/0042066 A1 | 2/2019 | Kim et al. | |

FOREIGN PATENT DOCUMENTS

| | | |
|---|---|---|
| KR | 10-2014-0099133 A | 8/2014 |
| KR | 10-2015-0096952 A | 8/2015 |
| KR | 10-2016-0038510 A | 4/2016 |
| KR | 10-2016-0091072 A | 8/2016 |
| KR | 10-1649663 B1 | 8/2016 |
| KR | 10-2017-0006055 A | 1/2017 |
| KR | 10-2017-0053517 A | 5/2017 |
| KR | 10-2017-0074726 A | 6/2017 |
| KR | 10-2017-0093658 A | 8/2017 |

* cited by examiner

FOLDABLE ELECTRONIC DEVICE AND METHOD FOR CONTROLLING SCREEN BY USING GESTURE

CROSS REFERENCE TO RELATED APPLICATIONS

This application is a National Phase Entry of PCT International Application No. PCT/KR2018/013347, which was filed on Nov. 6, 2018, and claims a priority to Korean Patent Application No. 10-2018-0011272, which was filed on Jan. 30, 2018, the contents of which are incorporated herein by reference.

TECHNICAL FIELD

Various embodiments relate to a foldable electronic device and a method for controlling a screen thereof using a gesture.

BACKGROUND ART

Due to the development of communication networks such as the Internet, various kinds of content have been developed. In order to provide such various kinds of content, electronic devices each including a flexible display or a plurality of displays have been developed. Such electronic devices may be implemented in a foldable type in order to provide enhanced usability.

DISCLOSURE OF INVENTION

Technical Problem

When the state of a foldable electronic device displaying information in an unfolded (outspread) state is changed to a folding state or a folded state, at least some of the information may be obscured by the change to the folded state. Therefore, measures for calling at least some of the obscured information may be required in the foldable electronic device.

The technical subjects pursued in the disclosure may not be limited to the above mentioned technical subjects, and other technical subjects which are not mentioned may be clearly understood, through the following descriptions, by those skilled in the art to which the disclosure pertains.

Solution to Problem

An electronic device according to various embodiments may include: a first housing including a first surface and a second surface that faces and is spaced apart from the first surface; a second housing including a third surface and a fourth surface that faces and is spaced apart from the third surface; a folding part pivotably connecting a side surface of the first housing with a side surface of the second housing that faces the side surface of the first housing; a flexible display disposed on the first surface and the third surface across the folding part and including a first area corresponding to the first surface and a second area corresponding to the third surface; and a processor. The processor may be configured to: display a first screen within the first area and a second screen within the second area in the first state in which the first housing and the second housing are folded out about the folding part; identify that the state of the electronic device is changed from the first state to the second state in which the first housing and the second housing are folded in about the folding part; cease, in response to the identifying, display of the second screen within the second area; detect input to the second area while the display of the second screen within the second area is ceased; and display, in response to the detecting, the second screen changed from the first screen within the first area.

An electronic device according to various embodiments may include: a first housing including a first surface and a second surface that faces and is spaced apart from the first surface; a second housing including a third surface and a fourth surface that faces and is spaced apart from the third surface; a folding part pivotably connecting a side surface of the first housing with a side surface of the second housing that faces the side surface of the first housing; a first display disposed on the first surface; a second display disposed on the third surface; and a processor. The processor may be configured to: display a first screen through the first display and display a second screen through the second display in the first state in which the first housing and the second housing are folded out about the folding part; identify that the state of the electronic device is changed from the first state to the second state in which the first housing and the second housing are folded in about the folding part; cease, in response to the identifying, displaying the second screen through the second display; detect input to the second display while the display of the second screen through the second display is ceased; and display, in response to the detecting, the second screen changed from the first screen through the first display.

A method of an electronic device according to various embodiments may include: an operation of displaying a first screen within a first area and displaying a second screen within a second area in the first state in which the first housing and the second housing of the electronic device are folded out about the folding part; an operation of identifying that the state of the electronic device is changed from the first state to the second state in which the first housing and the second housing are folded in about the folding part; an operation of ceasing, in response to the identifying, displaying the second screen within the second area; an operation of detecting input to the second area while the display of the second screen within the second area is ceased; and an operation of displaying, in response to the detecting, the second screen changed from the first screen within the first area.

A method of an electronic device according to various embodiments may include: an operation of displaying a first screen through a first display of the electronic device and displaying a second screen through a second display in the first state in which the first housing and the second housing of the electronic device are folded out about the folding part; an operation of identifying that the state of the electronic device is changed from the first state to the second state in which the first housing and the second housing are folded in about the folding part; an operation of ceasing, in response to the identifying, displaying the second screen through the second display; an operation of detecting input to the second display while the display of the second screen through the second display is ceased; and an operation of displaying, in response to the detecting, the second screen changed from the first screen through the first display.

Advantageous Effects of Invention

A foldable electronic device and a method thereof according to various embodiments are capable of providing enhanced usability by displaying information obscured in the folded state using an intuitive input or gesture.

Effects obtainable from the disclosure may not be limited to the above-mentioned effects, and other effects which are not mentioned may be clearly understood, through the following descriptions, by those skilled in the art to which the disclosure pertains.

BEST MODE FOR CARRYING OUT THE INVENTION

Figure 1A:
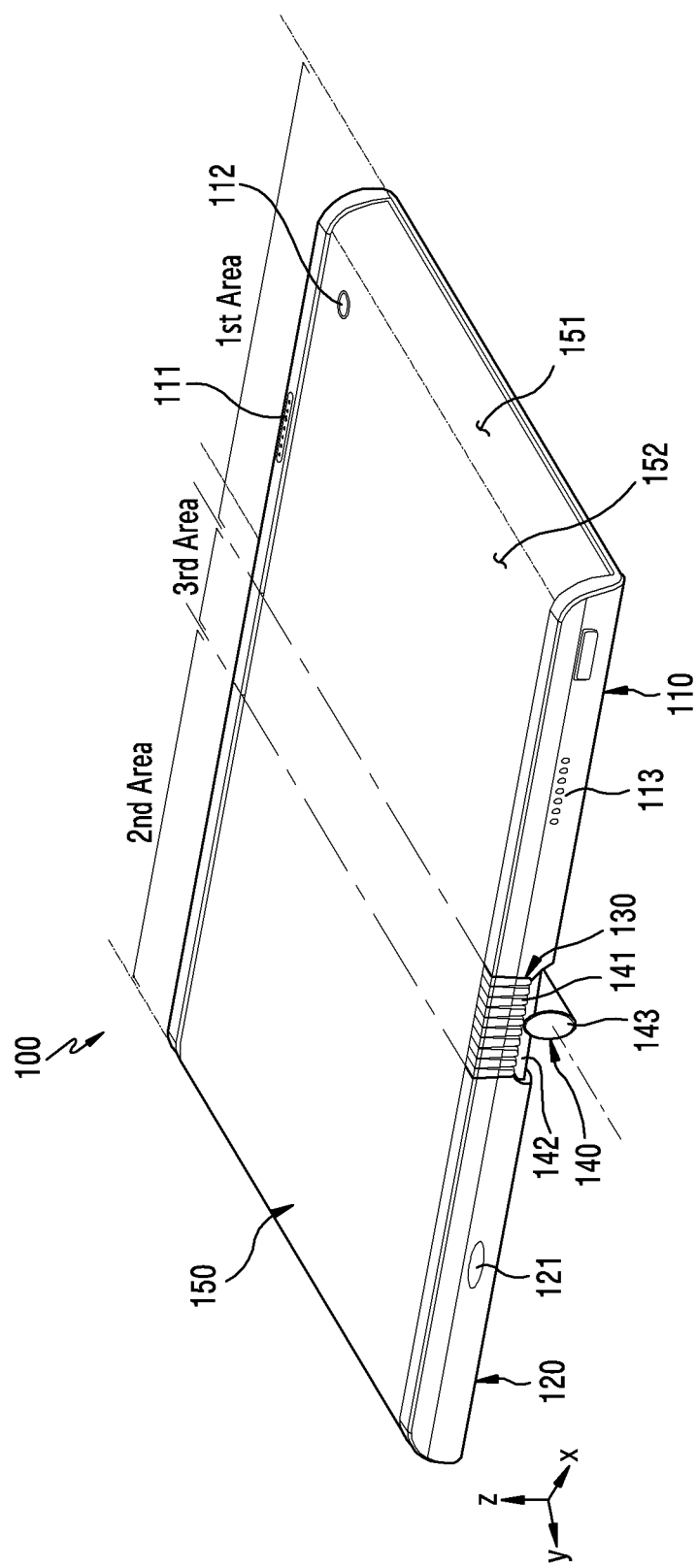
FIG. 1A is a perspective view illustrating the front side of a foldable electronic device in an unfolded state (outspread state) according to various embodiments.

Hereinafter, various embodiments of the disclosure will be described with reference to the accompanying drawings. However, it should be appreciated that they are not intended to limit the technological features set forth herein to particular embodiments and include various changes, equivalents, and/or alternatives for the embodiments of the disclosure. With regard to the description of the drawings, similar reference numerals may be used to designate similar or relevant elements.

As used herein, the expression "have", "may have", "include", or "may include" refers to the existence of a corresponding feature (e.g., numeral, function, operation, or constituent element such as component) and does not exclude the existence of additional features.

As used herein, the expression "A or B", "at least one of A and/or B", or "one of more of A and/or B" may include all possible combinations of items enumerated together. For example, "A or B", "at least one of A and B", or "at least one of A or B" may refer to all of (1) including at least one A, (2) including at least one B, or (3) including all of at least one A and at least one B.

The expressions "a first", "a second", "the first", "the second", and the like as used in various embodiments may modify various elements regardless of the order and/or the importance thereof, and do not limit the corresponding elements. These expressions may be used to distinguish between one element and any other element. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it should be understood that when an element (e.g., first element) is referred to as being "directly connected," or "directly coupled" to another element (second element), there are no element (e.g., third element) interposed between them.

The expression "configured to" used in the disclosure may be interchangeably used with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

An electronic device according to various embodiments of the disclosure may include at least one of, for example, a smartphone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., watch, ring, bracelet, anklet, necklace, glasses, contact lens, or head-mounted device (HMD)), a fabric or clothing-integrated type (e.g., electronic clothing), a body-mounted type (e.g., skin pad, or tattoo), and a bio-implantable type (e.g., implantable circuit).

According to some embodiments, the electronic device may include at least one of, for example, a television, a digital video disk (DVD) player, an audio, a refrigerator, an air conditioner, a vacuum cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to other embodiments, the electronic device may include at least one of various medical devices (e.g., various portable medical measuring devices (blood glucose monitoring device, heart rate monitoring device, blood pressure measuring device, body temperature measuring device, etc.), magnetic resonance angiography (MRA), magnetic resonance imaging (MRI), computed tomography (CT) machine, ultrasonic machine, etc.), a navigation device, a global positioning system (GPS) receiver, an event data recorder (EDR), a flight data recorder (FDR), a vehicle infotainment device, electronic equipment for a ship (e.g., ship navigation device, gyro-compass, etc.), avionics, a security device, an automobile head unit, a home or industrial robot, an automatic teller's machine (ATM) in banks, point of sales (POS) in a shop, or Internet of things devices (e.g., light bulb, various sensors, electric or gas meter, sprinkler device, fire alarm, thermostat, streetlamp, toaster, sporting goods, hot water tank, heater, boiler, etc.).

According to some embodiments, the electronic device may include at least one of a part of furniture or a building/structure, an electronic board, an electronic signature receiving device, a projector, and various kinds of measuring instruments (e.g., water meter, electric meter, gas meter, radio wave meter, etc.). In various embodiments, the electronic device may be a flexible electronic device or a foldable electronic device. The electronic device according to various embodiments of the disclosure is not limited to the aforementioned devices, and may include a new electronic device according to the development of technology.

In the disclosure, the term "user" may refer to a person using an electronic device or a device (e.g., artificial intelligence electronic device) using an electronic device.

Hereinafter, various embodiments of the disclosure will be described in detail with reference to the accompanying drawings. In the accompanying drawings, the sizes of some elements may be exaggerated or reduced for the convenience of description. For example, the size and thickness of each element are arbitrarily illustrated for the convenience of description, and thus the disclosure is not limited by the illustrated size and thickness.

Figure 1B:
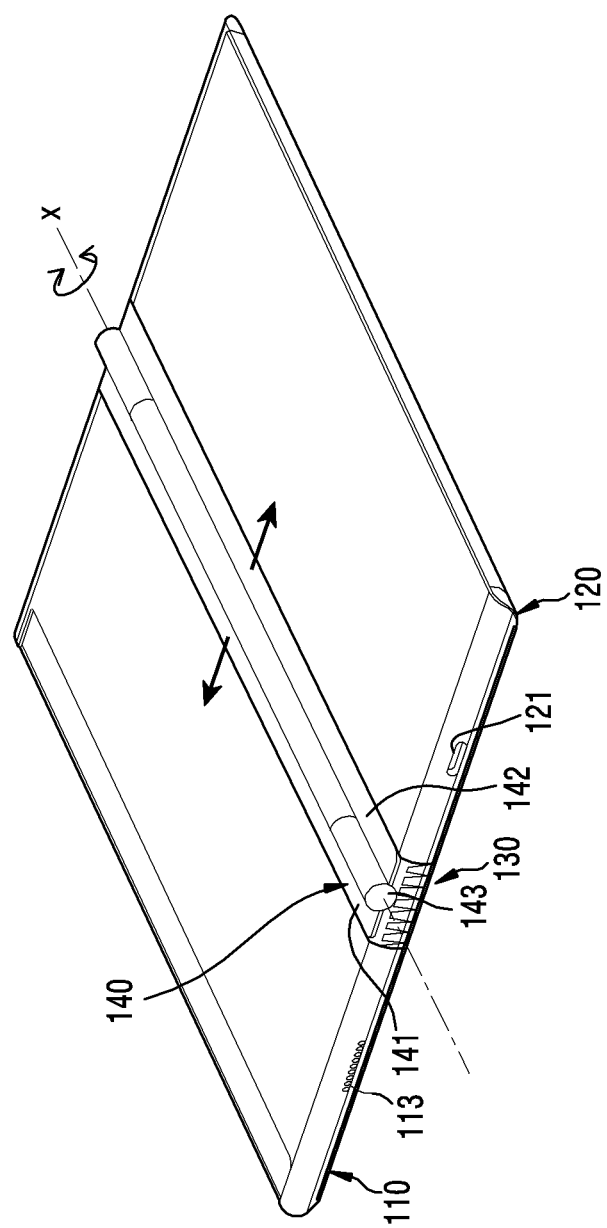
FIG. 1B is a perspective view illustrating the rear side of the foldable electronic device of FIG. 1A in the unfolded state according to various embodiments.
Figure 1C:
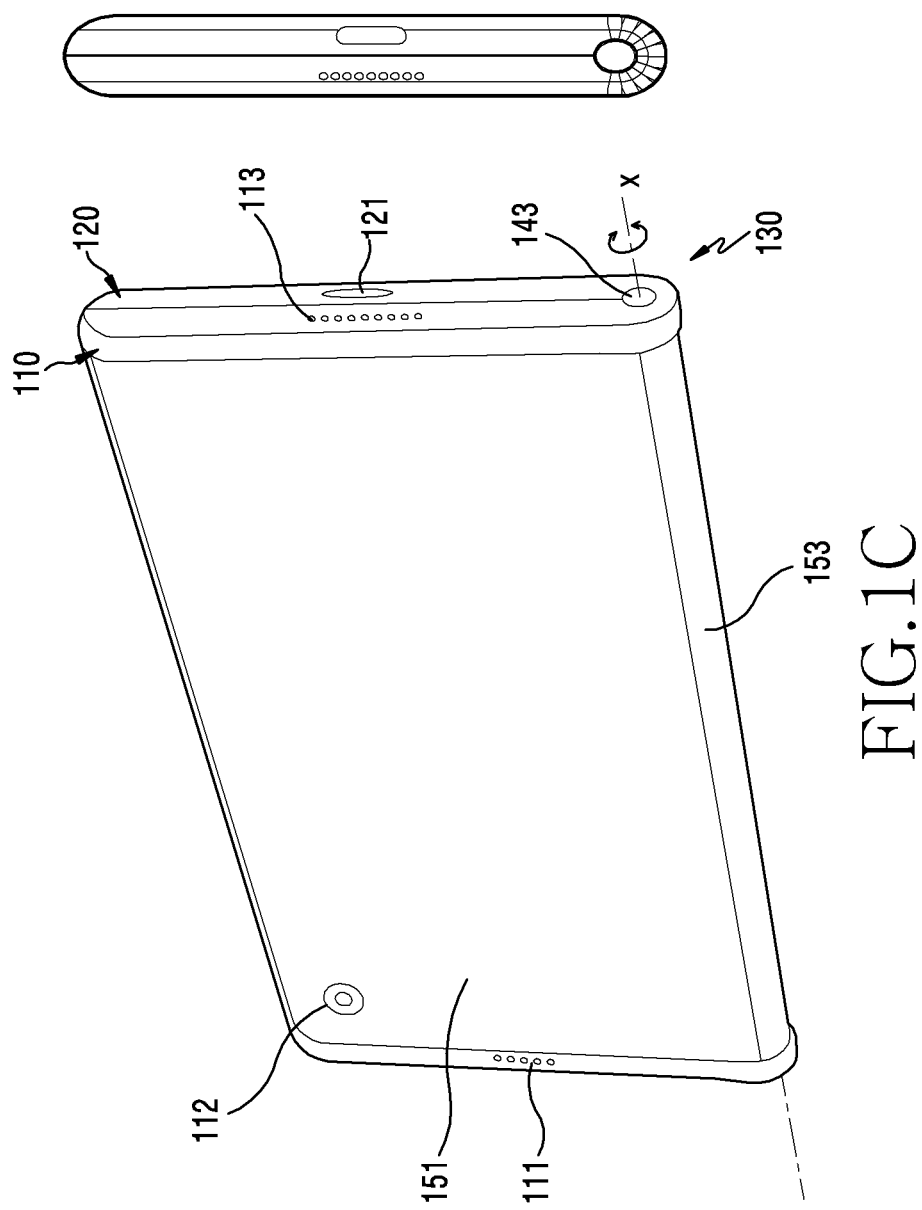
FIG. 1C is a perspective view illustrating the foldable electronic device of FIG. 1A in the folded state according to various embodiments.

FIG. 1A is a perspective view illustrating the front side of a foldable electronic device in an unfolded state (outspread state) according to various embodiments. FIG. 1B is a perspective view illustrating the rear side of the foldable electronic device of FIG. 1A in the unfolded state according to various embodiments. FIG. 1C is a perspective view illustrating the foldable electronic device of FIG. 1A in the folded state according to various embodiments.

Referring to FIGS. 1A to 1C, a foldable electronic device 100 according to various embodiments includes a first housing 110, a second housing 120, a folding part 130, a hinge part 140, and a flexible display 150.

In various embodiments, the first housing 110 may include a first surface and a second surface that faces and is spaced apart from the first surface. In various embodiments, the second housing 120 may include a third surface and a fourth surface that faces and is spaced apart from the third surface.

In various embodiments, the first housing 110 and the second housing 120 may be connected by the folding part 130. For example, the folding part 130 may be configured to be coupled to each of a side surface of the first housing 110 and a side surface of the second housing 120 that faces the side surface of the first housing 110 so as to pivotably or rotatably connect the first housing 110 and the second housing 120 to each other. The hinge part 140 may be disposed in the center of the rear surface of the foldable electronic device 100. In various embodiments, the hinge part 140 may form at least part of the appearance of the rear surface of the foldable electronic device 100. According to an embodiment, the foldable electronic device 100 may include a hinge center 143 in the center of the hinge part 140. The hinge center 143 may be configured to serve as a central axis (X axis) of a rotating motion when the first housing 110 and the second housing 120 are folded using the folding part 130. The flexible display 150 may be disposed on the first housing 110 and the second housing 120 across the folding part 130. In various embodiments, the flexible display 150 may be provided to be supported on the first housing 110 and the second housing 120. In various embodiments, the flexible display 150 may be disposed on the first surface and the third surface across the folding part 130. In various embodiments, the flexible display 150 may include a first area corresponding to the first surface and a second area corresponding to the third surface.

The foldable electronic device 100 according to various embodiments may be folded about the folding part 130. For example, the folding part 130 may be disposed between the first housing 110 and the second housing 120 of the foldable electronic device 100 so as to allow the foldable electronic device 100 to be bent, flexed, or folded. In various embodiments, the first housing 110 may be connected to the second housing 120 through the folding part 130 so as to rotate about the folding part 130. In various embodiments, the first housing 110 and the second housing 120 may be folded to face each other by rotating the hinge center 143 of the hinge part 140 about the folding part 130 as a rotation axis (X axis). In various embodiments, the first housing 110 and the second housing 120 may be substantially superimposed, or may overlap each other.

In various embodiments, the foldable electronic device 100 may provide the first state, in which the first housing 110 and the second housing 120 are folded out about the folding part 130. In various embodiments, in the first state, the first surface may be substantially flush with the third surface. In various embodiments, the foldable electronic device 100 may provide the first state, in which the first housing 110 and the second housing 120 are substantially flush with each other by being folded out about the folding part 130. In various embodiments, the first state may be the state in which, among the entire area of the flexible display 150, all of the first area corresponding to the first surface, the second area corresponding to the third surface, and the third area enclosing the folding part 130 are capable of being provided within the field of view or angle of view of a user who faces the front surface of the foldable electronic device 100. In various embodiments, the first state may be referred to as an outspread state, or may be referred to as an unfolded state.

In various embodiments, the foldable electronic device 100 may provide the second state in which the first housing 110 and the second housing 120 are folded in about the folding part 130. In various embodiments, in the second state, the second surface may be superimposed on the fourth surface. In various embodiments, the foldable electronic device 100 may provide the second state in which the folding part 130 is folded such that the rear surface (e.g., the second surface) of the first housing 110 and the rear surface (e.g., the fourth surface) of the second housing 120 face each other, and thus the first housing 110 and the second housing 120 are disposed to be parallel to each other. In various embodiments, the second state may be the state in which, among the entire area of the flexible display 150, at least part of the first area corresponding to the first surface and the third area enclosing the folding part 130 are capable of being provided within the field of view or angle of view of a user who faces the front surface of the foldable electronic device 100. In various embodiments, the second state may be referred to as a folded state.

In various embodiments, the folding part 130 may include multiple folding members. The multiple folding members may be pivotably connected such that the foldable electronic device 100 can be folded. For example, adjacent multiple folding members may be hinged to rotate relative to each other. In various embodiments, the multiple folding members adjacent to the first housing 110 and the second housing 120 may be hinged to be folded stepwise with a constant curvature when the foldable electronic device is folded or unfolded. In various embodiments, in the foldable electronic device 100, the respective rear surfaces of the first housing 110 and the second housing 120 may be folded to face each other by a rotation operation between the multiple folding members included in the folding part 130.

In various embodiments, each of the multiple folding members may include a body having a predetermined length and opposite end portions disposed on respective ends of the body. The front surfaces of the bodies of the multiple folding members may not be exposed to the outside by the flexible display 150 disposed across the folding part 130. The rear surfaces of the bodies of the multiple folding members may not be exposed to the outside by the hinge part 140 disposed on the rear surface of the folding part. In various embodiments, only the opposite ends of the multiple folding members may be exposed to the outside of the foldable electronic device 100 so as to form a portion of the outer surface of the foldable electronic device 100. The number of folding members may be set differently depending on the thickness of the foldable electronic device 100. In various embodiments, the opposite ends of the multiple folding members may include various shapes for a mutual folding function. For example, the opposite ends of each of the multiple folding members may include a hexagonal shape including a gap formed in a folding direction, a circular shape formed in one direction, or a circular shape formed in opposite directions with reference to the most central folding member.

In various embodiments, the hinge part 140 may include a first planar portion 141, a second planar portion 142, and a hinge center 143. The hinge center 143 may pivotably couple the first planar portion 141 and the second planar portion 142 to each other. For example, a hinge arm formed at one end of the first planar portion 141 and a hinge arm formed in the second planar portion 142 may be coupled to each other so as to form the hinge center 143. As another example, the hinge arm of the first planar portion 141 and the hinge arm of the second planar portion 142 constituting the hinge center 143 may be integrally formed with the planar portions, respectively, but may be formed separately and fixedly coupled. The hinge center 143 may be disposed in the center of the hinge part 140.

Referring to FIG. 1B, the hinge part 140 may be disposed on the rear surface of the foldable electronic device 100. For example, the hinge part 140 may be disposed on the rear surface of the foldable electronic device 100 along the x-axis direction of the folding part 130 connecting the first housing 110 and the second housing 120 with the hinge center 143 as the center. In various embodiments, the first planar portion 141 may be disposed so as to be inserted into an accommodation space included in the rear surface of the first housing 110. The second planar portion 142 may be disposed to be inserted into an accommodation space included in the rear surface of the second housing 120. For example, the first planar portion 141 and the second planar portion 142 may be arranged to slide in the direction of insertion into respective accommodation spaces included in the first housing 110 and the second housing 120. In various embodiments, the hinge part 140 may constitute the appearance of the rear surface of the foldable electronic device 100 together with the first housing 110 and the second housing 120. In various embodiments, the hinge part 140 may form at least part of the appearance of the rear surface of the foldable electronic device 100.

In various embodiments, the hinge center 143 may be configured as a central axis (x-axis) of the operation of folding the foldable electronic device 100. For example, when the state of the foldable electronic device 100 is changed from the first state to the second state, the hinge center 143 may be configured as the central axis (x axis) of the rotation operation of the folding part 130. In various embodiments, when the foldable electronic device 100 is changed from the first state to the second state, the multiple folding members of the folding part 130 may rotate about the hinge center 143, and the first planar portion 141 and the second planar portion 142, coupled to the hinge center 143, may also rotate about the hinge center 143. In various embodiments, the first housing 110, the second housing 120, and the folding part 130 constituting substantially the entire foldable electronic device 100 have a predetermined thickness. Thus, when the foldable electronic device 100 is folded and unfolded with reference to the folding part 130, a length difference (or an area difference) may occur between the front portion on which the flexible display 150 is disposed and the rear portion on which the hinge portion 140 is disposed. The length difference (or the area difference) between the front portion and the rear portion is offset by inserting the planar portion 141 and the second planar portion 142 into the respective accommodation spaces included in the first housing 110 and the second housing 120. In various embodiments, the length difference (or the area difference) between the front portion and the rear portion may be offset by sliding the planar portion 141 and the second planar portion 142 in the direction in which they are inserted into the accommodation spaces included in the first housing 110 and the second housing 120. In various embodiments, the first planar portion 141 and the second planar portion 142 may slide in the direction in which the first planar portion 141 and the second planar portion 142 are inserted into the first housing 110 and the second housing 120, respectively, by the operation of rotating the hinge part 140 constituting at least part of the appearance of the rear surface of the foldable electronic device 100. Due to the movement described above, the area occupying the appearance of the foldable electronic device 100 may be reduced.

In various embodiments, the flexible display 150 may be disposed on the front surface (e.g., the third surface) of the second housing 120 across the first housing 110 and the folding part 130. According to an embodiment, the flexible display 150 may include a flexible touch screen device that includes a touch sensor. In various embodiments, the flexible display 150 may include a touch sensor and a force sensor. The foldable electronic device 100 according to various embodiments may be folded with reference to the folding part 130. The flexible display 150 is bendable by the operation of folding the electronic device 100 because the flexible display 140 is disposed from the first housing 110 to the second housing 120 across the folding part 130. For example, in the flexible display 150, unlike the first area disposed on the first surface of the first housing 110 and the second area disposed on the third surface of the second housing 120, the third area disposed above the folding part 130 is bendable according to the operation of folding the electronic device 100. In various embodiments, the third area may be curved and bent in order to prevent breakage of the flexible display 150.

In various embodiments, at least one of the first area and the second area may further include a curved area, such as the third area. For example, an end that is located away from the center of the first housing 110 may include a round area. In various embodiments, the first area of the flexible display 150 may include a display area 151 curved at an end of the first housing 110 and a flat display area 152 covering the flat portion of the first housing 110. In addition to the end of the first housing 110, the end of the second housing 120 may include a rounded area. In various embodiments, the second area of the flexible display 150 may include a display area curved at an end of the second housing 120 and a flat display area covering the flat portion of the second housing 120. In various embodiments, the curved display area 151 included within the first area and the curved display area included within the second area are disposed at the ends of the first housing 110 and the second housing 120, respectively, and thus each of the curved display areas may be referred to as an edge display. Referring to FIG. 1C, since the ends of the first housing 110 and the second housing 120 have a round shape, when the ends are engaged with each other, the ends may form an integral round shape. In various embodiments, when the foldable electronic device 100 is in the second state, the ends of the first and second housings 110 and 120 and the curved area of the flexible display 150 that is disposed on the folding part 130 may be in contact with each other. In various embodiments, the foldable electronic device 100 may provide an integral display in a circumferential direction through the edge displays at opposite ends of the foldable electronic device 100 in the second state. In various embodiments, the foldable electronic device 100 may provide a user with a display that has a large area and is seamless in the circumferential and lengthwise directions. In various embodiments, the round shape formed by the folding 130 of the foldable electronic device 100 and the round shape formed by the ends of the first and second housings 110 and 120 may provide an improved gripping sensation.

According to various embodiments, a speaker device 111 may be disposed at the upper side of the housing 110 so as to output the voice of a counterpart. In addition, various components for conducting various functions of the electronic device 100 may be arranged around the speaker device 111. For example, the various components may include at least one sensor module. The sensor module may include at least one of, for example, an illuminance sensor (e.g., an optical sensor), a proximity sensor, an infrared sensor, and an ultrasonic sensor. As another example, the various components may include a light-emitting diode (LED) indicator for providing status information of the electronic device 100 to the user. In various embodiments, a camera device 112 may be included above the first area of the flexible display 151. Since the folding part 130 is folded out in order to expose the flexible display 150, the camera device 112 is capable of operating in both the folded state and the unfolded state. According to an embodiment, a microphone device 113 may be disposed in the lower side surface of the first housing 110 to transmit the voice of the user to the counterpart.

The foldable electronic device 100 illustrated in FIGS. 1A to 1C may be an exemplary foldable electronic device having a flexible display according to various embodiments. According to various embodiments, it should be noted that, in the second state, a foldable electronic device 100 that provides a partial area of the flexible display through a portion of the front surface thereof and another partial area of the flexible display through a portion of the rear surface thereof may be implemented in a configuration different from the configuration illustrated in FIGS. 1A to 1C. For example, the foldable electronic device 100 may be implemented in the state in which at least part of the folding part 130 and/or the hinge part 140 are not exposed to the outside. However, the electronic device is not limited thereto.

Figure 2:
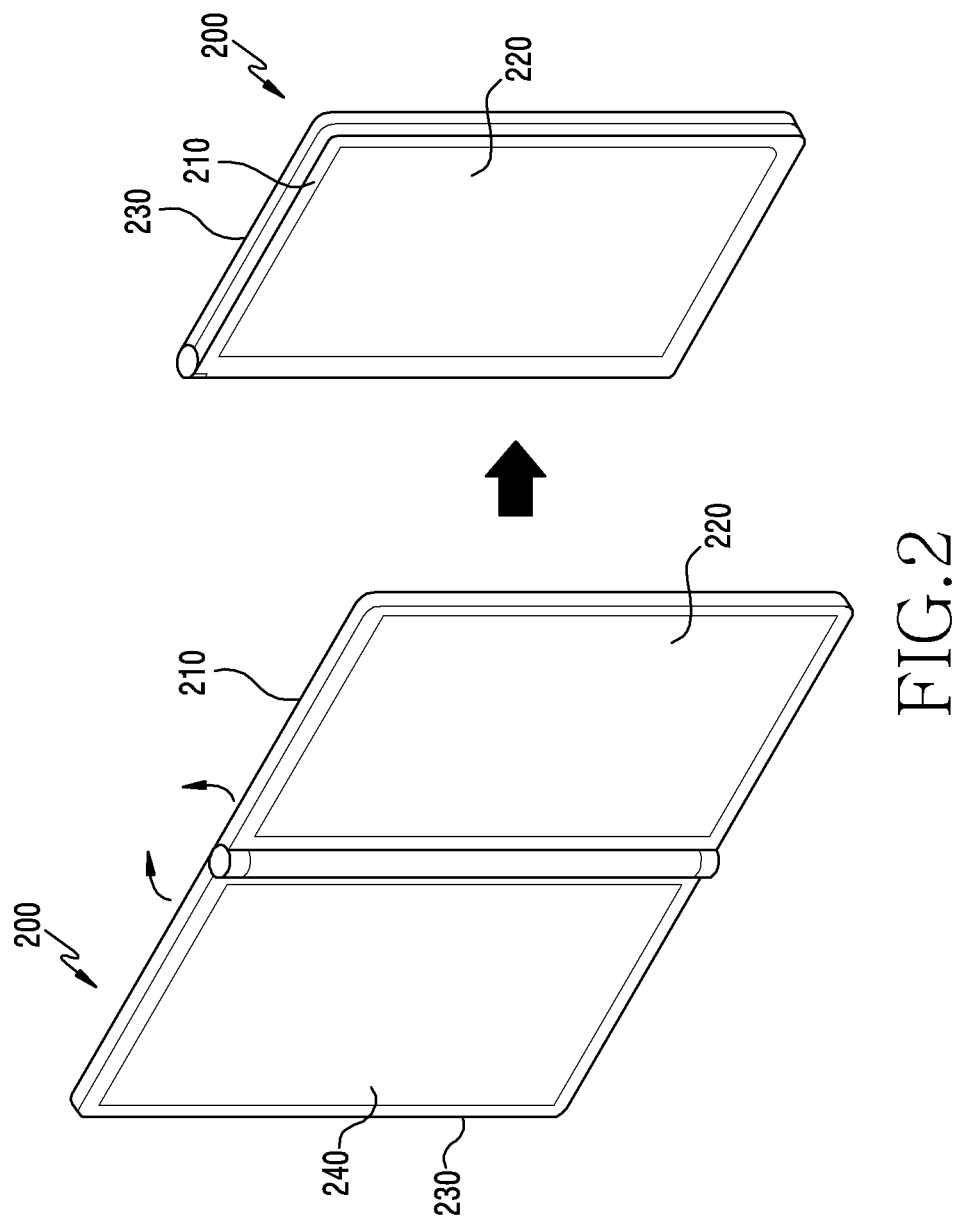
FIG. 2 is a perspective view illustrating an electronic device including a plurality of displays according to various embodiments.

FIG. 2 is a perspective view illustrating a foldable electronic device including a plurality of displays according to various embodiments.

Referring to FIG. 2, the foldable electronic device 200 may include a first housing 210 and a second housing 230. In various embodiments, the first housing 210 and the second housing 230 may be pivotably connected to each other. The side surface of the first housing 210 and the side surface of the second housing 230 facing the side surface of the first housing 210 may be hinged to each other such that the foldable electronic device 200 is capable of being folded. In various embodiments, the first housing 210 and the second housing 220 may be configured as a single housing without an independent connection member, and the single housing may be configured such that the first housing 210 and the second housing 220 are capable of being rotated.

In various embodiments, the first housing 210 may include a first surface and a second surface that faces and is spaced apart from the first surface. In various embodiments, the second housing 230 may include a third surface and a fourth surface that faces and is spaced apart from the third surface. In various embodiments, the first display 220 may be disposed on the first surface of the first housing 210, and the second display 240 is placed on the third surface of the second housing 230. In various embodiments, the first display 220 may be exposed through at least part of the first surface of the first housing 210, and the second display 240 may be exposed through at least part of the third surface of the second housing 230.

In various embodiments, the foldable electronic device 100 may provide the first state, in which the first housing 110 and the second housing 120 are folded out by the folding part 130. In various embodiments, in the first state, the first surface may be substantially flush with the third surface. In various embodiments, the foldable electronic device 100 may provide the first state in which the first housing 110 and the second housing 120 are substantially flush with each other by being folded out about the folding part 130. In various embodiments, the first state may be the state in which, among the entire area of the flexible display 150, all of the first area corresponding to the first surface, the second area corresponding to the third surface, and the third area corresponding to the folding part 130 are capable of being provided within the field of view or angle of view of a user who faces the front surface of the foldable electronic device 100. In various embodiments, the first state may be referred to as an outspread state, or may be referred to as an unfolded state.

In various embodiments, the foldable electronic device 100 may provide the second state in which the first housing 110 and the second housing 120 are folded in by the folding part. In various embodiments, in the second state, the second surface may be superimposed on the fourth surface. In various embodiments, the foldable electronic device 100 may provide the second state in which the folding part 130 is folded such that the rear surface (e.g., the second surface) of the first housing 110 and the rear surface (e.g., the fourth surface) of the second housing 120 face each other, and thus the first housing 110 and the second housing 120 are disposed to be parallel to each other. In various embodiments, the second state may be the state in which, among the entire area of the flexible display 150, at least part of the first area corresponding to the first surface and the third area corresponding to the folding part 130 are capable of being provided within the field of view or angle of view of a user who faces the front surface of the foldable electronic device 100. In various embodiments, the second state may be referred to as a folded state.

Although not illustrated in FIG. 2, the foldable electronic device 200 may include a folding part described above with reference to FIGS. 1A to 1C so as to connect the first housing and the second housing.

The following descriptions will be made on the basis of an electronic device including one flexible display. However, it should be noted that the following description may also be implemented in an electronic device including a plurality of displays.

Figure 3A:
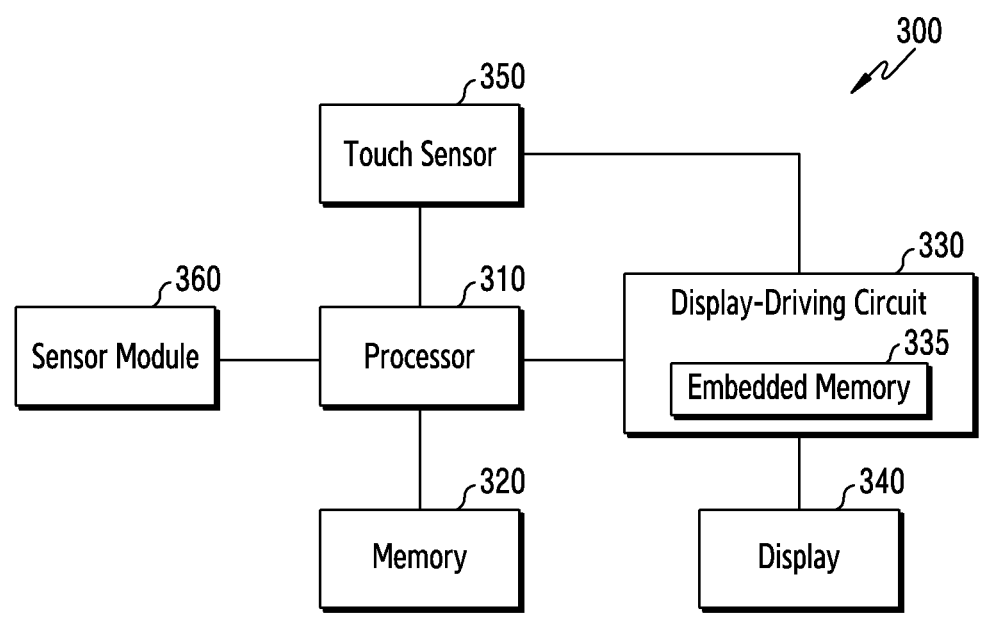
FIG. 3A illustrates an exemplary functional configuration of an electronic device according to various embodiments.

FIG. 3A illustrates an exemplary functional configuration of an electronic device according to various embodiments. The electronic device 300 illustrated in FIG. 3A may be implemented as the foldable electronic device 100 illustrated in FIG. 1 or the foldable electronic device 200 illustrated in FIG. 2.

Referring to FIG. 3A, the electronic device 300 may include a processor 310, memory 320, a display-driving circuit 330, a display 340, a touch sensor 350, and a sensor module 360.

The processor 310 may control the overall operation of the electronic device 300. The processor 310 may execute applications that provide advertisements, the Internet, games, video images, or the like. In various embodiments, the processor 310 may include a single processor core, or may include a plurality of processor cores. For example, the processor 310 may include a multi-core such as a dual-core, a quad-core, or a hexa-core. According to embodiments, the processor 310 may further include cache memory located internally or externally.

The processor 310 may receive commands from other components of the electronic device 300, may interpret the received commands, and may perform calculations or process data in response to the interpreted commands.

The processor 310 may process data or signals produced or generated in an application. For example, the processor 310 may request instructions, data, or signals from the memory 320 in order to execute or control an application. The processor 310 may write (or store) or update instructions, data, or signals in the memory 320 in order to execute or control an application.

The processor 310 may interpret and process messages, data, instructions, or signals received from the memory 320, the display-driving circuit 330, the touch sensor 350, or the sensor module 360. The processor 310 may produce new messages, data, instructions, or signals on the basis of the received messages, data, instructions, or signals. The processor 310 may provide processed or produced messages, data, instructions, or signals to the memory 320, the display-driving circuit 330, the touch sensor 350, or the sensor module 360.

All or part of the processor 310 may be electrically or functionally coupled with or connected to other components within the electronic device 300 (e.g., the memory 320, the display-driving circuit 330, the touch sensor 350, or the sensor module 360).

According to embodiments, the processor 310 may be configured with one or more processors. For example, the processor 310 may include an application processor (AP) that controls a higher-layer program such as an application, a communications processor (CP) that performs control for communication, or the like.

The memory 320 may store instructions, control instruction code, control data, or user data for controlling the electronic device 300. For example, the memory 320 may include an application, an operating system (OS), middleware, and a device driver.

The memory 320 may include at least one of volatile memory and nonvolatile memory. The volatile memory may include dynamic random access memory (DRAM), static RAM (SRAM), synchronous DRAM (SDRAM), phase-change RAM (PRAM), magnetic RAM (MRAM), resistive RAM (RRAM), ferroelectric RAM (FeRAM), or the like. The nonvolatile memory may include read-only-memory (ROM), programmable ROM (PROM), electrically programmable ROM (EPROM), electrically erasable ROM (EEPROM), flash memory, or the like.

The memory 320 may include a nonvolatile medium such as a hard disc drive (HDD), a solid state disc (SSD), an embedded multimedia card (eMMC), or a universal flash storage (UFS).

The display-driving circuit 330 may receive image data or image information including an image control signal corresponding to a command for controlling the image data through an interface between the processor 310 and the display-driving circuit 330 (e.g., a general purpose input/output (GPIO) interface, a serial peripheral interface (SPI), or a mobile industry processor interface (MIPI)) from the processor 310 (e.g., a main processor or an auxiliary processor). The display-driving circuit 330 may communicate with the touch sensor 350 through the interface between the display-driving circuit 330 and the touch sensor 350. The display-driving circuit 330 may store at least some of the received image information in frame units in embedded memory (e.g., graphic random access memory (GRAM)) included in the display-driving circuit 330. The display-driving circuit 330 pre-processes or post-processes at least some of the image data (e.g., resolution, brightness, or scaling) at least partially on the basis of the characteristics of the image data or the characteristics of the display 340. The display-driving circuit 330 may convert the pre-processed image data or the post-processed image data into a voltage value or a current value capable of driving the pixels at least partially on the basis of the attributes of the pixels of the display 340 (e.g., an array of pixels (RGB stripe or PenTile) and the size of each of subpixels thereof). For example, the pixels of the display 340 may be driven at least partly on the basis of the voltage value or the current value, thereby displaying visual information (e.g., a text, image, or an icon) corresponding to the image data.

The display 340 may output content, data, or signals. In various embodiments, the display 340 may display image data processed by the processor 310. For example, the display 340 may display a captured or still image. As another example, the display 340 may display a video image or a camera preview image. As another example, the display 340 may display a graphical user interface (GUI) such that the user is able to interact with the electronic device 300.

The display 340 may be configured with a liquid crystal display (LCD) or an organic light-emitting diode (OLED) display. For example, the display 340 may be implemented to be flexible, transparent, or wearable. As another example, the display 340 may be included in a cover of a case coupled to the electronic device 300. However, the electronic device is not limited thereto.

The display 340 may display a screen on the basis of a signal received from the display-driving circuit 330. The display 340 may include a plurality of data lines and a plurality of gate lines. The plurality of data lines and the plurality of gate lines may cross each other in the display 340. A plurality of pixels may be disposed in areas where the plurality of data lines and the plurality of gate lines cross each other. When the display 340 is configured with an OLED panel, each of the plurality of pixels may include at least one switching element and one OLED. Each of the pixels may emit light on the basis of a signal received from the display-driving circuit 330.

According to embodiments, the display 340 may be configured with an integrated touch screen by being coupled with a touch sensor capable of receiving touch input or the like.

The touch sensor 350 may include a plurality of sensors and a touch sensor IC for controlling the plurality of sensors. For example, the touch sensor IC may control the plurality of sensors to measure a change in a signal a specific position of the display 340 (e.g., a voltage, a light amount, a resistance, or a charge amount), thereby detecting touch input or hovering input at the specific position, and may provide information about the detected touch input or the detected hovering input (e.g., a position, an area, a pressure, or a time) regarding the detected touch input or the detected hovering input. According to an embodiment, the touch sensor IC may be included in the electronic device 300 as a part of the display-driving circuit 330 or the display 340, or as a component that is distinct from the display-driving circuit 330 and the display 340 (e.g., an auxiliary processor within the processor 310).

In various embodiments, when the touch sensor 350 is of an electrostatic type, the touch sensor IC may include a touch analog front end (AFE), an analog-digital converter (ADC), a digital signal processor (DSP), or a microcontroller unit (MCU). Meanwhile, in various embodiments, the plurality of sensors included in the touch sensor 350 may include a plurality of x-axis line sensors (i.e., a plurality of short-line sensors) and a plurality of y-axis line sensors (i.e., a plurality of long-line sensors).

The touch AFE may include a plurality of x-axis transmitters for concurrently or simultaneously charging the plurality of x-axis line sensors and a plurality of y-axis transmitters for concurrently or simultaneously charging the plurality of y-axis line sensors simultaneously.

The touch AFE may include a plurality of receivers for sensing at least one (or a pair) of the x-axis line sensors or at least one (or a pair) of the y-axis line sensors. The plurality of receivers may simultaneously sense the at least one line sensor (or the pair of line sensors). The charging of the touch AFE and the sensing of the touch AFE may be performed simultaneously.

The touch AFE may process a touch input (or hovering input) received through the plurality of sensors. For example, the plurality of sensors may provide the touch AFE with information about a magnitude of change in capacitance caused by the touch input. The touch AFE may generate an analog signal on the basis of information about the magnitude of change in capacitance. The touch AFE may provide the analog signal to the ADC. The operation of the touch AFE may be performed within an operating cycle of the touch sensor IC (an inverse number of an operating frequency).

The ADC may receive the analog signal from the touch AFE. The ADC may obtain a digital signal converted from the analog signal. The ADC may provide the digital signal to the DSP.

The DSP may receive the digital signal from the ADC. The DSP may acquire coordinate information about the touch input by processing the digital signal. The DSP may be implemented with ARM™.

According to embodiments, the operation of the DSP may be performed within the operating cycle of the touch sensor IC or outside the operating cycle of the touch sensor IC. At least part of the operation of the DSP may be performed in parallel with at least part of the operation of the touch AFE.

The sensor module 360 may be used in order to identify the state of the electronic device 300. For example, the sensor module 360 may be used to identify that the state of the electronic device 300 is the first state. As another example, the sensor module 360 may be used to identify that the state of the electronic device 300 is the second state. As another example, the sensor module 360 may be used to identify that the state of the electronic device 300 is changed (or switched) from the first state to the second state. As another example, the sensor module 360 may be used to identify that the state of the electronic device 300 is changed from the second state to the first state. To this end, the sensor module 360 may include at least one sensor.

The at least one sensor included in the sensor module 360 may include at least one of a hall sensor disposed in the rear surface of the first housing of the electronic device 300 (e.g., the second surface of the first housing 110 illustrated in FIG. 1) and a hall sensor disposed in the rear surface of the second housing of the electronic device 300 (e.g., the fourth surface of the second housing 110 illustrated in FIG. 1) The processor 310 may identify the state of the electronic device 300 or a change (or switch) in the state of the electronic device 300 at least partially on the basis of information about a change in a magnetic field received from the at least one hall sensor included in the sensor module 360.

The at least one sensor included in the sensor module 360 may include at least one of an illuminance sensor (or a proximity sensor) disposed on the rear surface of the first housing of the electronic device 300 or an illuminance sensor (or a proximity sensor) disposed on the rear surface of the second housing of the electronic device 300. The processor 310 may identify the state of the electronic device 300 or a change in the state of the electronic device 300 at least partially on the basis of information about a change in light received from at least one proximity sensor included in the sensor module 360.

The at least one sensor included in the sensor module 360 may be at least one of a touch sensor disposed on the rear surface of the first housing of the electronic device 300 or a touch sensor disposed on the rear surface of the second housing of the electronic device 300. The processor 310 may identify the state of the electronic device 300 or a change in the state of the electronic device 300 at least partially on the basis of information received from the at least one touch sensor included in the sensor module 360.

The at least one sensor included in the sensor module 360 may include a sensor included in the folding part (e.g., the folding part 130 illustrated in FIG. 1) configured to pivotably connect the first housing of the electronic device 300 and the second housing of the electronic device 300 so as to detect a change in the state of the plurality of folding members in the folding part. The processor 310 may identify the state of the electronic device 300 or a change in the state of the electronic device 300 at least partially on the basis of information received from the sensor included in the sensor module 360 so as to detect the change in the state.

In various embodiments, the processor 310 may provide the display-driving circuit 330 with a screen, information, or information about content to be displayed through the display 340. In order to store the screen, the information, or information about the content in the embedded memory 335 included in the display driving circuit 330, the processor 310 may provide the information to the display-driving circuit 330. The display-driving circuit 330 may store or write the information obtained from the processor 310 in embedded memory 335. The storage or the writing may be performed on a frame-by-frame basis.

In various embodiments, the processor 310 may provide the display-driving circuit 330 with information about a first screen to be displayed in the first area (e.g., the first area illustrated in FIG. 1) corresponding to the front surface of the first housing (e.g., the first surface of the first housing 110 illustrated in FIG. 1) among the entire area of the display 340, and may provide the display-driving circuit 330 with information about a second screen to be displayed in the second area (e.g., the second area illustrated in FIG. 1) corresponding to the front surface of the second housing (e.g., the third surface of the second housing 120 illustrated in FIG. 1) among the entire area of the display 340.

Figure 3B:
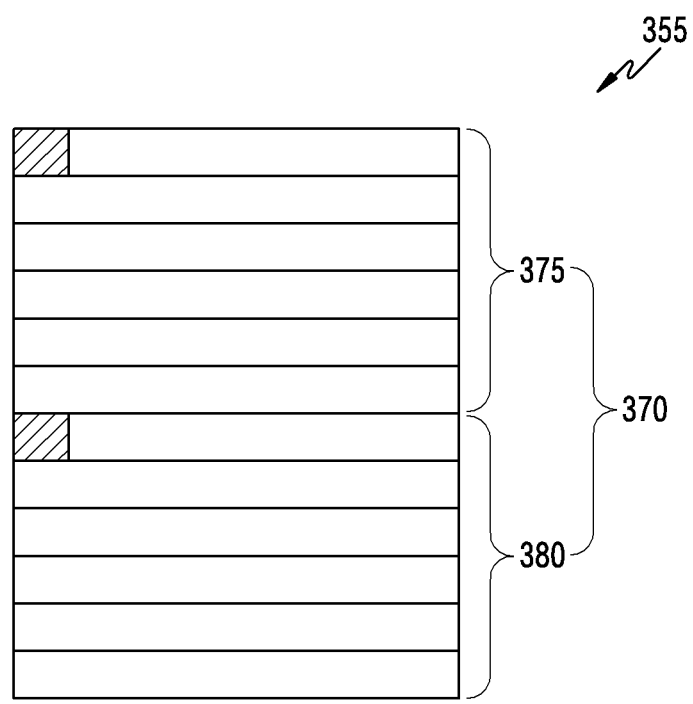
FIG. 3B is a view illustrating an exemplary configuration of embedded memory included in a display-driving circuit of an electronic device according to various embodiments.

In various embodiments, each of the information about the first screen and the information about the second screen may be stored in the embedded memory 335. In various embodiments, the area in which the information about the first screen is stored in the storage area of the embedded memory 335 may be distinct from the area in which the information about the second screen is stored in the storage area of the embedded memory 335. For example, referring to FIG. 3B, the processor 310 may store the information about the first screen within a first designated area 375 in the storage area 370 of the embedded memory through the display-driving circuit 330, and may store the information about the second screen within a second designated area 380 in the storage area 370 of the embedded memory 335.

In various embodiments, the display-driving circuit 330 may scan information stored in the embedded memory 335. In various embodiments, the display-driving circuit 330 may scan the information stored in the embedded memory 335 in order to display information, a screen, or content through the display 340. In various embodiments, the display-driving circuit 330 may scan the information stored in the first designated area 375 within the storage area 370 of the embedded memory 335 in order to display the first screen in the first area through the display 340. In various embodiments, the display-driving circuit 330 may scan the second designated area 380 within the storage area 370 of the embedded memory 335 in order to display the second screen in the storage area 370 through the display 340. In various embodiments, the display-driving circuit 330 may scan the information stored in the first designated area 375 within the storage area 370 of the embedded memory 335 on the basis of a control signal received from the processor 310. In various embodiments, the display-driving circuit 330 may scan the information stored in the second designated area 380 within the storage area 370 of the embedded memory 335 on the basis of a control signal received from the processor 310.

In various embodiments, through the display 340, the processor 310 may display the first screen within the first area and may display the second screen within the second area, using the display driving circuit 330.

In various embodiments, in the first state, the processor 310 may display the first screen within the first area by scanning the first designated area 375 using the display-driving circuit 330, and may display the second screen within the second area by scanning the second screen within the second designated area 380 using the display-driving circuit 330.

In various embodiments, the processor 310 may identify that the state of the electronic device 300 is changed from the first state to the second state. In various embodiments, the processor 310 may identify that the state of the electronic device 300 is changed from the first state to the second state at least partially on the basis of information obtained through the sensor module 360.

In various embodiments, the processor 310 may cease display of the second screen within the second area on the basis of identifying that the state of the electronic device 300 is changed from the first state to the second state. Meanwhile, the processor 310 may maintain display of the first screen within the first area while the display of the second screen within the second area is ceased.

In various embodiments, the processor 310 may provide the display-driving circuit 330 with a control signal for ceasing display of the second screen within the second area in response to identifying that the state of the electronic device 300 is changed from the first state to the second state. The display-driving circuit 330 may cease or terminate scanning of the second designated area 380 of the embedded memory 335 in response to receiving the control signal.

Displaying the second screen within the second area may be restricted on the basis of ceasing of the scan or termination of the scan.

In various embodiments, the processor 310 may store information about a blank screen in the second designated area 380 by providing the display-driving circuit 330 with information about a blank screen (or a black screen) in response to identifying that the state of the electronic device 300 is changed from the first state to the second state. The display-driving circuit 330 may display the blank screen within the second area through the display 340 by scanning the information about the blank screen.

In various embodiments, restricting display of the second screen within the second area may mean cutting off power provided to light-emitting elements arranged within the second area. In various embodiments, restricting the display of the second screen within the second area may mean providing power lower than reference power to the light-emitting elements arranged within the second area.

In various embodiments, the touch sensor 350 may operate in an active state while the display of the second screen within the second area is ceased. In various embodiments, the active state may be the state in which steady state power is provided to the touch sensor 350. In various embodiments, the touch sensor 350 may operate in the active state irrespective of whether the second screen is displayed within the second area.

In various embodiments, the processor 310 may be configured to control a power management integrated circuit (PMIC) of the electronic device 300 to keep providing power to at least one touch sensor disposed at a position corresponding to the second area among the plurality of sensors included in the touch sensor 350 while the display of the second screen within the second area is ceased.

In various embodiments, the processor 310 may detect an input (or a gesture) to the second area while the display of the second screen within the second area is ceased. In various embodiments, the processor 310 may detect the input to the second area through the touch sensor 350 while the display of the second screen within the second area is ceased. In various embodiments, the input may be used to invoke or call the second screen, the display of which is ceased. In various embodiments, the input may include various types of inputs. For example, the input may include double-tap input to the second area. As another example, the input may include at least one of single-tap input to the second area, drag input to the second area, force touch input to the second area, touch input, having a designated pattern, to the second area, hovering input, having a designated pattern, to the second area, or touch input, maintained for a designated time or more, to the second area. However, the disclosure is not limited thereto.

In various embodiments, the processor 310 may display the second screen changed from the first screen within the first area on the basis of detection of the input. In various embodiments, the processor 310 may transmit, to the display-driving circuit 330, a control signal for changing the screen to be provided within the first area from the first screen to the second screen in response to detection of the input. The display-driving circuit 330 may scan the second designated area 380 of the embedded memory 335 on the basis of reception of the control signal. The display-driving circuit 330 may change the screen displayed within the first area from the first screen to the second screen by scanning the second designated area 380.

In various embodiments, information about the second screen stored in the second designated area 380 may be discarded after a designated time has elapsed. In various embodiments, the designated time may correspond to a time for providing normal power to the at least one touch sensor disposed in the second area. In various embodiments, the designated time may be set so as to reduce the amount of power consumed by the at least one touch sensor while the display of information on the second screen within the second area is ceased. In various embodiments, the designated time may be predefined, or may be defined by the user's setting.

In various embodiments, when the information about the second screen stored in the second designated area 380 is discarded after the designated time has elapsed, the processor 310 may maintain the display of the first screen within the first area even if input to the second area is detected while the display of the second screen within the second area is ceased. In various embodiments, when the information about the second screen stored in the second designated area 380 is discarded after the designated time has elapsed, the processor 310 may not receive the input to the second area due to deactivation of the at least one touch sensor disposed in the second area while the display of the second screen within the second area is ceased. Due to the non-reception of input, the processor 310 may maintain the display of the first screen within the first region even if the user causes an input to the second area while the display of the second screen within the second area is ceased.

In various embodiments, the information about the second screen may be discarded in accordance with the input performed by the user. In various embodiments, the processor 310 may detect input for discarding the information about the second screen while the display of the second screen within the second area is ceased. In various embodiments, the input for discarding the information on the second screen may include input related to a recent key configured in the electronic device 300. In various embodiments, the input for discarding the information on the second screen may include input related to a clear application configured in the electronic device 300.

In various embodiments, the processor 310 may discard the information on the second screen on the basis of detection of the input. In various embodiments, when the information about the second screen is discarded in accordance with the input, the processor 310 may maintain the display of the first screen within the first area even if input to the second area (input for calling the second screen, which has been displayed in the second area) is detected.

As described above, the electronic device 300 according to various embodiments may provide a service for calling the second screen, the display of which has been ceased due to the change from the first state to the second state, through an intuitive user input. Through the provision of the service, the electronic device 300 may provide an enhanced user experience (UX).

Figure 4:
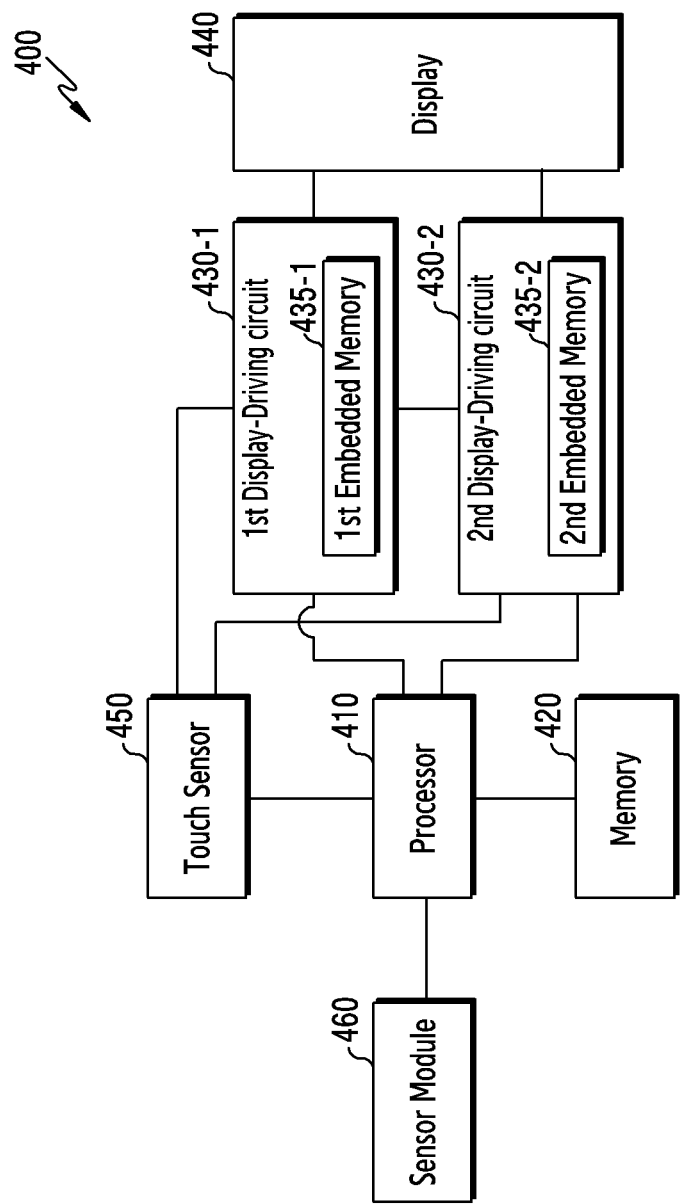
FIG. 4 illustrates another exemplary functional configuration of an electronic device according to various embodiments.

FIG. 4 illustrates another exemplary functional configuration of an electronic device according to various embodiments. An electronic device 400 illustrated in FIG. 4 may be implemented as the foldable electronic device 100 illustrated in FIG. 1 or as the foldable electronic device 200 illustrated in FIG. 2.

Referring to FIG. 4, the electronic device 400 may include a processor 410, memory 420, a first display-driving circuit 430-1, a second display-driving circuit 430-2, a display 440, a touch sensor 450, and a sensor module 460.

The processor 410 may include the processor 310 illustrated in FIG. 3, and the memory 420 may include the memory 320 illustrated in FIG. 3. Each of the first display-driving circuit 430-1 and the second display-driving circuit 430-2 may include the display-driving circuit 330 illustrated in FIG. 3, and the display 440 may include the display 340 illustrated in FIG. 3. The touch sensor 450 may include the touch sensor 350 illustrated in FIG. 3, and the sensor module 460 may include the sensor module 360 illustrated in FIG. 3.

In the flowing description of FIG. 4, parts identical or similar to those in the description of FIG. 3 may be omitted.

In various embodiments, the processor 410 may provide the first display-driving circuit 430-1 with information about a first screen to be displayed in the first area (e.g., the first area illustrated in FIG. 1) corresponding to the front surface of the first housing (e.g., the first surface of the first housing 110 illustrated in FIG. 1) among the entire area of the display 440, and may provide the second display-driving circuit 430-2 with information about a second screen to be displayed in the second area (e.g., the second area illustrated in FIG. 1) corresponding to the front surface of the second housing (e.g., the third surface of the second housing 120 illustrated in FIG. 1) among the entire area of the display 440.

In various embodiments, the information about the first screen may be stored in a first embedded memory 435-1 included in the first display-driving circuit 430-1. In various embodiments, the information about the second screen may be stored in a second embedded memory 435-2 included in the second display-driving circuit 430-2.

In various embodiments, the first display-driving circuit 430-1 may scan the information about the first screen stored in the first embedded memory 435-1. The second display-driving circuit 430-2 may scan the information about the second screen stored in the second embedded memory 435-2.

In various embodiments, the processor 410 may display the first screen within the first area by scanning the storage area of the first embedded memory 435-1 using the first display-driving circuit 430-1, and may display the second screen within the second area by scanning the storage area of the second embedded memory 435-2 using the second display-driving circuit 430-2.

In various embodiments, the processor 410 may cease display of the second screen within the second area in response to identifying that the state of the electronic device 400 is changed from the first state to the second state. The processor 410 may maintain the display of the first screen within the first area while the display of the second screen within the second area is ceased.

In various embodiments, the processor 410 may cease display of the second screen within the second area by cutting off power provided to the second display-driving circuit 430-2 in response to the identifying. In various embodiments, in response to the identifying, the processor 410 may cease display of the second screen within the second area by transmitting, to the second display-driving circuit 430-2, a control signal for requesting that the second display-driving circuit 430-2 cease scanning of the storage area of the second embedded memory 435-2.

In various embodiments, the processor 410 may detect input to the second area while the display of the second screen within the second area is ceased. In various embodiments, the processor 410 may detect the input to the second area through the touch sensor 450 activated independently of ceasing the display of the second screen within the second area.

In various embodiments, the processor 410 may display the second screen changed from the first screen within the first area on the basis of detection of the input.

For example, in response to detecting the input, the processor 410 may provide the first display-driving circuit 430-1 with the information about the second screen that was last stored in the second embedded memory 435-2. The first display-driving circuit 430-1 may store the information about the second screen in the first embedded memory 435-1. The processor 410 may display the second screen changed from the first screen within the first region by scanning the information about the second screen stored in the first embedded memory 435-1 using the first display-driving circuit 430-1.

As another example, in response to detecting the input, the processor 410 may transmit, to the first display-driving circuit 430-1, a control signal for requesting that the first display-driving circuit 430-1 scan the second embedded memory 435-2. The first display-driving circuit 430-1 may scan the information about the second screen stored in the second embedded memory 435-2 on the basis of the control signal. The processor 410 may display the information about the second screen changed from the first screen within the first region by scanning the information about the second screen stored in the second embedded memory 435-2 using the first display-driving circuit 430-1.

As described above, unlike the electronic device 300, the electronic device 400 according to various embodiments may include a plurality of display-driving circuits. The electronic device 400 according to various embodiments may provide a service for calling the second screen, the display of which has been ceased due to the change to the second state through intuitive user input by controlling the plurality of display-driving circuits. Through the provision of the above service, the electronic device 400 may provide an improved user experience.

Figure 5:
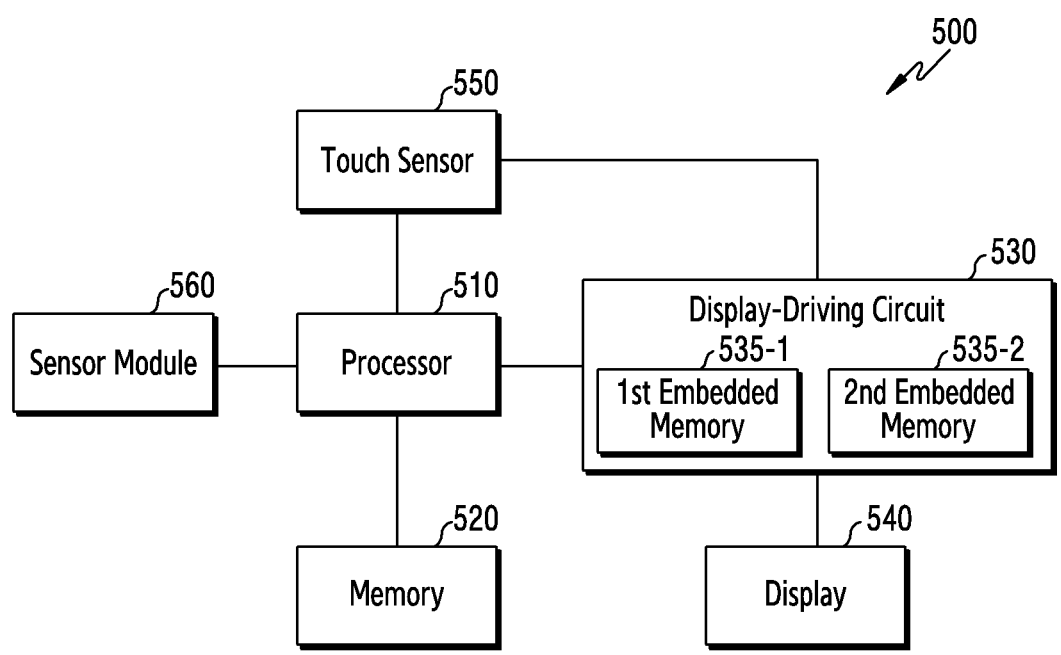
FIG. 5 illustrates still another exemplary functional configuration of an electronic device according to various embodiments.

FIG. 5 illustrates still another exemplary functional configuration of an electronic device according to various embodiments. The electronic device 500 illustrated in FIG. 5 may be implemented as the foldable electronic device 100 illustrated in FIG. 1 or as the foldable electronic device 200 illustrated in FIG. 2.

Referring to FIG. 5, the electronic device 500 may include a processor 510, memory 520, a display-driving circuit 530, a display 540, a touch sensor 550, and a sensor module 560.

The processor 510 may include the processor 310 illustrated in FIG. 3, and the memory 520 may include the memory 320 illustrated in FIG. 3. The display-driving circuit 530 may include the display-driving circuit 330 illustrated in FIG. 3, and the display 540 may include the display 340 illustrated in FIG. 3. The touch sensor 550 may include the touch sensor 350 illustrated in FIG. 3, and the sensor module 560 may include the sensor module 360 illustrated in FIG. 3.

In the flowing description of FIG. 5, parts identical or similar to those in the description of FIG. 3 may be omitted.

In various embodiments, the processor 510 may provide the display-driving circuit 530 with information about a first screen to be displayed in the first area (e.g., the first area illustrated in FIG. 1) corresponding to the front surface of the first housing (e.g., the first surface of the first housing 110 illustrated in FIG. 1) among the entire area of the display 540, and may provide the display-driving circuit 530 with information about a second screen to be displayed in the second area (e.g., the second area illustrated in FIG. 1) corresponding to the front surface of the second housing (e.g., the third surface of the second housing 120 illustrated in FIG. 1) among the entire area of the display 540.

In various embodiments, the information about the first screen may be stored in a first embedded memory 535-1, and the information about the second screen may be stored in a second embedded memory 535-2 which is physically distinct from the first embedded memory 535-1.

In various embodiments, the display-driving circuit 530 may scan the information about the first screen stored in the first embedded memory 535-1, and may scan the information about the second screen stored in the second embedded memory 535-2.

In various embodiments, the processor 510 may display the first screen within the first area by scanning the storage area of the first embedded memory 535-1 using the display-driving circuit 530, and may display the second screen within the second area by scanning the storage area of the second embedded memory 535-2 using the display-driving circuit 530.

In various embodiments, the processor 510 may cease the display of the second screen within the second area in response to identifying that the state of the electronic device 500 is changed from the first state to the second state. The processor 510 may maintain the display of the first screen within the first area while the display of the second screen within the second area is ceased.

In various embodiments, in response to the identifying, the processor 510 may cease display of the second screen within the screen area by discarding or deleting the information about the second screen stored in the second embedded memory 535-2. In various embodiments, in response to the identifying, the processor 510 may cease display of the second screen within the second area by transmitting, to the display-driving circuit 530, a control signal for requesting that the display-driving circuit 530 cease scanning of the storage area of the second embedded memory 535-2.

In various embodiments, the processor 510 may detect input to the second area while the display of the second screen within the second area is ceased. In various embodiments, the processor 510 may detect the input to the second area through the touch sensor 550 activated independently of ceasing the display of the second screen within the second area.

In various embodiments, the processor 510 may display the second screen changed from the first screen within the first area on the basis of detection of the input.

For example, in response to detecting the input, the processor 510 may provide the display-driving circuit 530 with the information about the second screen that was last stored in the second embedded memory 535-2. The display-driving circuit 530 may store the information about the second screen in the first embedded memory 535-1. The processor 510 may display the second screen changed from the first screen within the first region by scanning the information about the second screen stored in the first embedded memory 535-1 using the display-driving circuit 530.

As another example, in response to detecting the input, the processor 510 may transmit, to the display-driving circuit 530, a control signal for requesting that the display-driving circuit 530 scan the second embedded memory 535-2. The display-driving circuit 530 may scan the information about the second screen stored in the second embedded memory 535-2 on the basis of the control signal. The processor 510 may display the information about the second screen changed from the first screen within the first region by scanning the information about the second screen stored in the second embedded memory 535-2 using the display-driving circuit 530.

As described above, unlike the electronic device 300 and the electronic device 400, the electronic device 500 according to various embodiments may include a plurality of internal memories in the display-driving circuit. The electronic device 500 according to various embodiments may provide a service for calling the second screen, the display of which has been ceased, due to the change to the second state through an intuitive user input by controlling the scanning of the plurality of internal memories by the display-driving circuit.

Through the provision of the above service, the electronic device 500 may provide an improved user experience.

An electronic device according to various embodiments described above may include: a first housing including a first surface and a second surface that faces and is spaced apart from the first surface; a second housing including a third surface and a fourth surface that faces and is spaced apart from the third surface; a folding part pivotably connecting a side surface of the first housing with a side surface of the second housing that faces the side surface of the first housing; a flexible display disposed on the first surface and the third surface across the folding part and including a first area corresponding to the first surface and a second area corresponding to the third surface; and a processor. The processor may be configured to: display a first screen within the first area and a second screen within the second area in the first state in which the first housing and the second housing are folded out about the folding part; identify that the state of the electronic device is changed from the first state to the second state in which the first housing and the second housing are folded in about the folding part; cease, in response to the identifying, displaying the second screen within the second area; detect input to the second area while the display of the second screen within the second area is ceased; and display, in response to the detecting, the second screen changed from the first screen within the first area.

In various embodiments, in the second state, the second surface may be superimposed on the fourth surface.

In various embodiments, in the first state, the first surface may be substantially flush with the third surface.

In various embodiments, the processor may be configured to cease, in response to the identifying, displaying the second screen within the second area by restricting power provided to light-emitting elements disposed within the second area.

In various embodiments, the electronic device may further include a plurality of touch sensors disposed on the flexible display, and the processor may be configured to keep providing power to at least one touch sensor disposed at a position corresponding to the second area among the plurality of touch sensors while the display of the second screen is ceased. In various embodiments, the processor may be configured to detect input to the second area through the at least one touch sensor while the display of the second screen is ceased.

In various embodiments, the electronic device may further include a first display-driving circuit operably connected to the flexible display and the processor, and a second display-driving circuit operably connected to the flexible display and the processor, and the flexible display may further include a third area enclosing the folding part. The first display-driving circuit may be configured to control the display of a screen within the first area and a portion of the third area, and the second display-driving circuit may be configured to control the display of a screen within the second area and another portion of the third area. In various embodiments, the first display-driving circuit may include a first embedded memory and the second display-driving circuit may include a second embedded memory.

The processor may be configured to: store first information about the first screen in the first embedded memory included in the first display-driving circuit and store second information about the second screen in the second embedded memory included in the second display-driving circuit; display the first screen within the first area by scanning the first information stored in the first embedded memory using the first display-driving circuit, and display the second screen within the second area by scanning the second information stored in the second embedded memory using the second display-driving circuit; and display, in response to the detecting, the second screen changed from the first screen within the first area by scanning the second information stored in the second embedded memory using the first display-driving circuit.

In various embodiments, the electronic device may include embedded memory and may further include a display-driving circuit operably connected to the processor, and operably connected to the flexible display. The processor may be configured to: store first information about the first screen in a first designated area included in the embedded memory in the display-driving circuit, and store second information about the second screen in a second designated area included in the embedded memory in the display-driving circuit; display the first screen within the first area by scanning the first designated area using the display-driving circuit, and display the second screen within the second area by scanning the second designated area using the display-driving circuit; and display, in response to the detecting, the second screen changed from the first screen within the first area by scanning the second designated area using the display-driving circuit.

In various embodiments, the input may include double-tap input to the second area.

In various embodiments, the first screen may correspond to a portion of a wallpaper, the second screen may correspond to another portion of a wallpaper, and the processor may be configured to: cease, in response to the identifying, display of the second screen within the second area, and display, within the first area, the first screen including a plurality of page indicators to which a page indicator for indicating the second screen is added. In various embodiments, the page indicator for indicating the second screen among the plurality of indicators may be subsequent to a page indicator for indicating the first screen among the plurality of page indicators.

In various embodiments, the processor may be configured to cease, in response to the identifying, display of the second screen within the second area, and display, within the first area, a thumbnail image superimposed on the first screen and representing the screen. In various embodiments, the processor may be further configured to: detect input on the thumbnail image while the display of the second screen is ceased; and display the second screen changed from the first screen within the first area in response to detecting the input on the thumbnail image. In various embodiments, the processor may be further configured to cease the display of the thumbnail image in response to detecting input for scrolling the first screen while the thumbnail image is displayed. In various embodiments, the first screen may correspond to a portion of a wallpaper, the second screen may correspond to another portion of a wallpaper, and in response to detecting input for moving an object included in the first screen to the thumbnail image while the thumbnail image is displayed, the processor may be further configured to cease display of the object within the first screen and to display the thumbnail image representing the second screen changed due to the movement of the object.

In various embodiments, the processor may be further configured to: detect input for discarding the information about the second screen while the display of the second screen within the second area is ceased; discard the information about the second screen on the basis of detection of the input and detect input on the second area after discarding the information about the second screen; and maintain the display of the first screen within the first area even if input on the second area is detected.

An electronic device according to various embodiments described above may include: a first housing including a first surface and a second surface that faces and is spaced apart from the first surface; a second housing including a third surface and a fourth surface that faces and is spaced apart from the third surface; a folding part pivotably connecting a side surface of the first housing with a side surface of the second housing that faces the side surface of the first housing; a first display disposed on the first surface; a second display disposed on the third surface; and a processor. The processor may be configured to: display a first screen through the first display and display a second screen through the second display in the first state in which the first housing and the second housing are folded out about the folding part; identify that the state of the electronic device is changed from the first state to the second state in which the first housing and the second housing are folded in about the folding part; cease, in response to the identifying, the display of the second screen through the second display; detect input to the second display while the display of the second screen through the second display is ceased; and display, in response to the detecting, the second screen changed from the first screen through the first display.

In various embodiments, in the second state, the second surface may be superimposed on the fourth surface.

In various embodiments, in the first state, the first surface may be substantially flush with the third surface.

Figure 6:
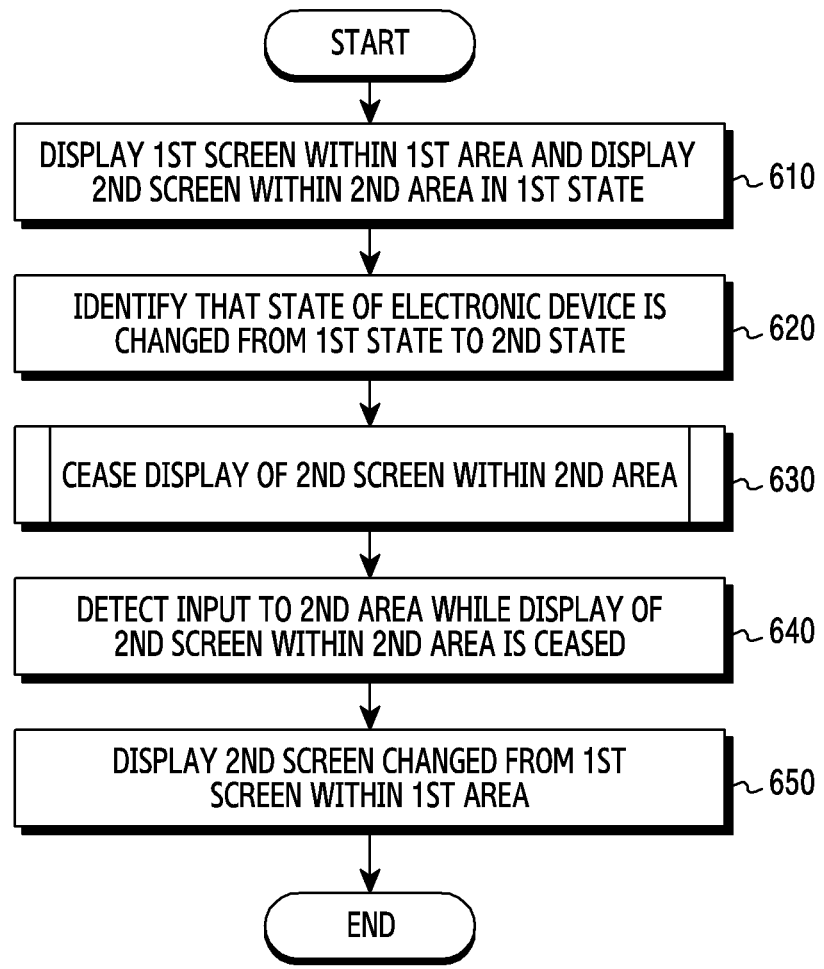
FIG. 6 illustrates exemplary operations of an electronic device according to various embodiments.

FIG. 6 illustrates exemplary operations of an electronic device according to various embodiments. These operations may be performed by the electronic device 100 illustrated in FIG. 1, the electronic device 200 illustrated in FIG. 2, the electronic device 300 illustrated in FIG. 3A, the electronic device 400 illustrated in FIG. 4, the electronic device 500 illustrated in FIG. 5, a processor included in the electronic device 100, a processor included in the electronic device 200, a processor 310 included in the electronic device 300, a processor 410 included in the electronic device 400, or a processor 510 included in the electronic device 500.

Referring to FIG. 6, in operation 610, the processor 310 may display the first screen within the first area and may display the second screen within the second area in the state in which the first housing of the electronic device 300 and the second housing of the electronic device 300 are folded out about the folding part pivotably connecting the first housing and the second housing. In various embodiments, the first housing may include a first surface oriented in a first direction and a second surface oriented in a second direction, opposite the first direction. In various embodiments, the second housing may include a third surface oriented in a third direction and a fourth surface oriented in a fourth direction, opposite the third direction. In various embodiments, the display 340 included in the electronic device 300 may be disposed on the first surface and the third surface across the folding part, and may include the first area, corresponding to the first surface, and the second area, corresponding to the third surface. In various embodiments, in the first state, the first surface may be substantially flush with the third surface. In various embodiments, the first area may be a region that displays a screen when the display 340 is in the active state independently of a change (or switch) of the state of the electronic device 300 including the first state and the second state. In various embodiments, the first area may be an area disposed in a housing (e.g., the first housing) that includes a transducer such as a microphone, a speaker, or a receiver. In various embodiments, the second area may be an area that is obscured by the change to the second state. In various embodiments, the second area may be an area that is deactivated by the change to the second state, unlike the first area. In various embodiments, the display 340 may include a flexible display. In various embodiments, the display 340 may include a plurality of displays. In various embodiments, each of the first screen and the second screen may include at least one of a wallpaper, an application execution screen, a lock screen, or a menu screen.

Each of the first screen and the second screen may be referred to as a user interface, information, at least one piece of content, a window or the like depending on the type of a service provided through each of the first screen and the second screen.

Figure 7:
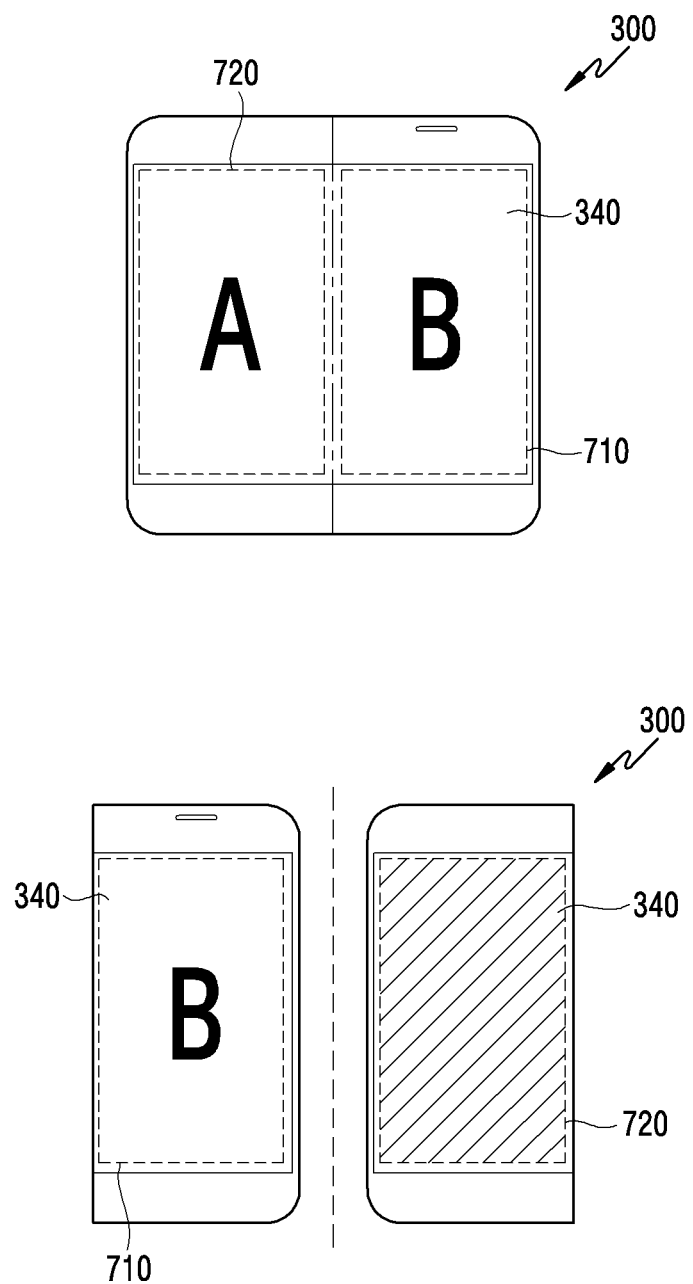
FIG. 7 illustrates exemplary screens displayed on an electronic device according to various embodiments in a first state.

For example, referring to FIG. 7, in the first state, through the display 340, the processor 310 may display the first screen B within a first area 710 and may display the second screen A within a second area 720.

In operation 620, the processor 310 may identify that the state of the electronic device 300 is changed from the first state to the second state in which the first housing and the second housing are folded in about the folding part. In various embodiments, in the second state, the second surface may be superimposed on the fourth surface. In various embodiments, the second state may be the state in which only the first area (or the first housing) is included in the field of view of a user who faces the front surface of the electronic device 300. In various embodiments, the second state may be the state in which the second area (or the second housing) is not included in the field of view of a user who faces the front surface of the electronic device 300. In various embodiments, the second state may be the state in which at least part of the second housing is obscured by the first housing. In various embodiments, the processor 310 may identify that the state of the electronic device 300 is changed from the first state to the second state through the sensor module 360.

In operation 630, the processor 310 may cease the display of the second screen within the second area in response to the identifying. In various embodiments, the processor 310 may cease the display of the second screen by displaying, within the second area, a blank screen changed from the second screen. In various embodiments, the processor 310 may cease the display of the second screen within the second area by restricting the power provided to light-emitting elements disposed in the second area. In various embodiments, in response to the identifying, the processor 310 may cease the display of the second screen so as to reduce the amount of power consumed by displaying the second screen within the second area.

For example, referring to FIG. 7, the processor 310 may cease the display of the second screen A within the second area 720 in response to the identifying. Meanwhile, the processor 310 may maintain the display of the first screen B within the first area 710, independently of the identifying.

In operation 640, the processor 310 may detect input to the second area while the display of the second screen within the second area is ceased. In various embodiments, the input may be input for calling the second screen, which has been displayed within the second area, which is obscured by the change to the second state. In various embodiments, the input may include user input received through the second area in the second state in which the electronic device 300 is gripped by the user. In various embodiments, the input may include tap input (including single-tap input and multi-tap input) to the second area.

Figure 8:
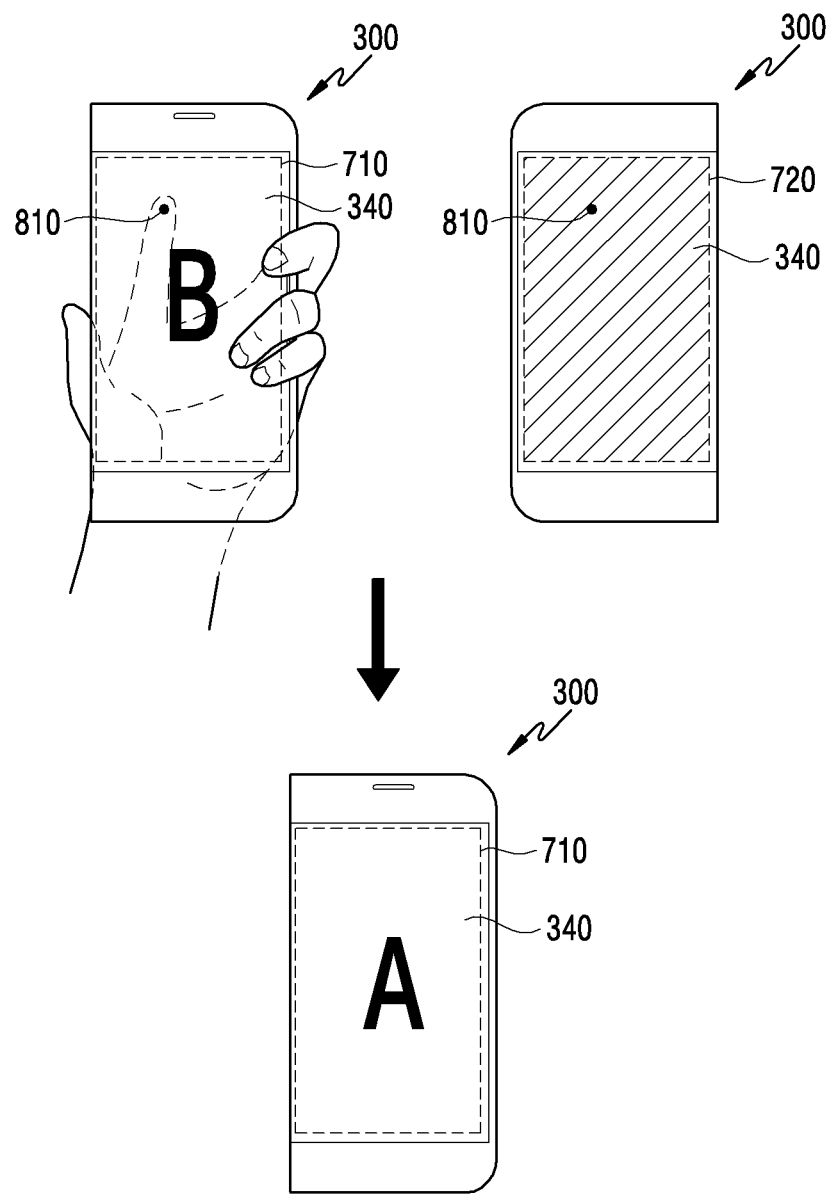
FIG. 8 illustrates exemplary screens displayed on an electronic device according to various embodiments in a second state.

For example, referring to FIG. 8, the processor 310 may detect input 810 to the second area while the display of the second screen within the second area is ceased in the second state.

In operation 650, the processor 310 may display the second screen changed from the first screen within the first area in response to the detecting. For example, referring to FIG. 8, the processor 310 may display the second screen A changed from the first screen B, in response to detecting the input 810 to the second area 720 while the display of the second screen within the second area 720 is ceased in the second state.

Figure 9:
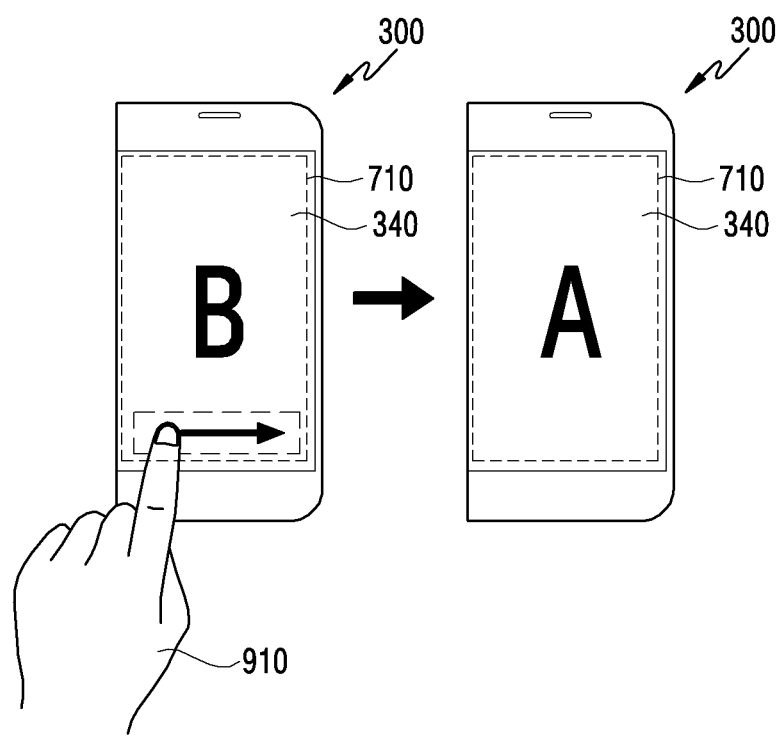
FIG. 9 illustrates an example of screen switching in an electronic device according to various embodiments in a second state.

In various embodiments, the processor 310 may perform other operations that replace operations 640 and 650, or may further perform other operations in addition to operations 640 and 650. For example, referring to FIG. 9, the processor 310 may display the first screen B within the first area 710 while the display of the second screen A within the second area 720 is ceased in the second state. The processor 310 may detect input 910 to the first area 710, in which the first screen B is displayed, while the display of the second screen A within the second area 720 is ceased in the second state. In various embodiments, the input 910 may include a drag input directed from a first position within the first area 710 toward a second position within the first area 710, which is distinct from the first position. In various embodiments, the first position may be located within a boundary (or an edge) of one of the borders (or edges) of the first area 710. In various embodiments, the first position may be any position within the first area 710. In various embodiments, the input 910 may include double-tap input on a specific position in the first area 710. The processor 310 may display the second screen A changed from the first screen B within the first area 710 in response to detecting the input 910. In various embodiments, in response to detecting the input 910, the processor 310 may cease the display of the first screen B within the first area 710 and may display the second screen A.

Figure 10:
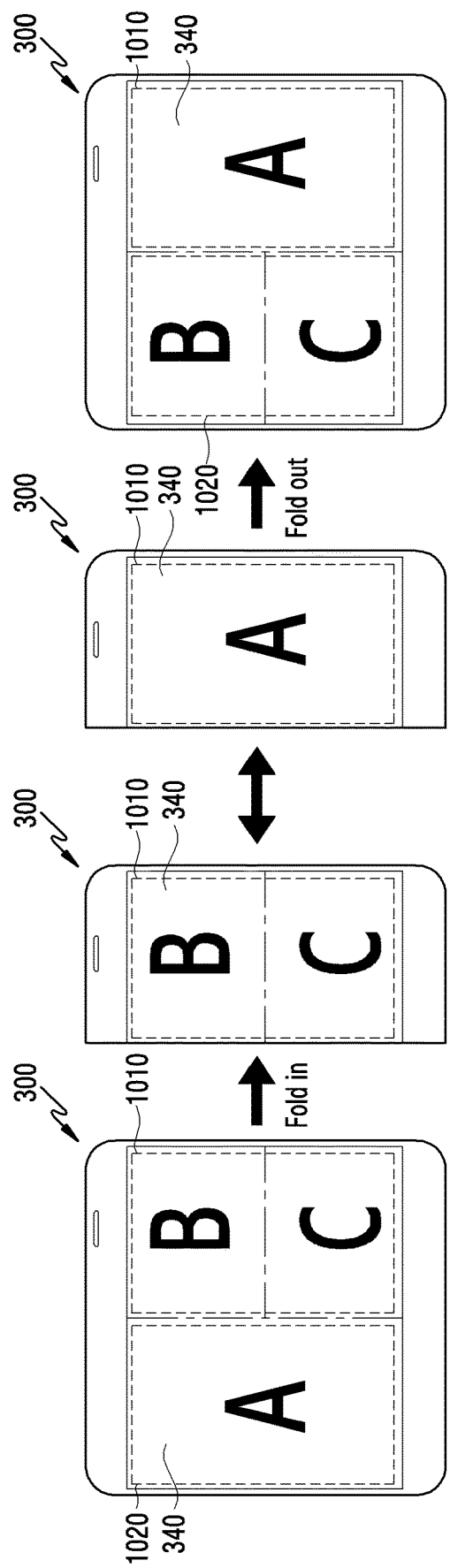
FIG. 10 illustrates an example of screen switching in an electronic device according to various embodiments.

FIG. 10 illustrates an example of screen switching in an electronic device according to various embodiments. This screen switching may be controlled by the electronic device 100 illustrated in FIG. 1, the electronic device 200 illustrated in FIG. 2, the electronic device 300 illustrated in FIG. 3A, the electronic device 400 illustrated in FIG. 4, the electronic device 500 illustrated in FIG. 5, a processor included in the electronic device 100, a processor included in the electronic device 200, a processor 310 included in the electronic device 300, a processor 410 included in the electronic device 400, or a processor 510 included in the electronic device 500.

Referring to FIG. 10, in the first state, through the display 340, the processor 310 may display first screens B and C within a first area 1010 and may display a second screen A within a second area 1020. In various embodiments, the first screen, displayed within the first area 1010 in the first state, may include first information B and second information C. In various embodiments, the first screen, displayed within the first area 1010 in the first state, may include a first user interface B and a second user interface C. In various embodiments, the first screen, displayed in the first area 1010 in the first state, may include a first window B and a second window C. In various embodiments, the first screen, displayed in the first area 1010 in the first state, may include first content B and second content C.

In various embodiments, the processor 310 may detect that the state of the electronic device 300 is changed from the first state to the second state while the first screens B and C are displayed within the first area 1010 and the second screen A is displayed within the second area 1020. Although not illustrated in FIG. 10, in various embodiments, the processor 310 may cease or restrict the display of the second screen A within the second area 1020 in response to the detecting. Meanwhile, the processor 310 may maintain the display of the first screens B and C within the first area 1010, independently of the detection.

In various embodiments, the processor 310 may detect input for calling the second screen A while the display of the second screen A in the second area 1020 is ceased in the second state. For example, the input for calling the second screen A may be input to the second area 1020.

In various embodiments, in response to detecting the input, the processor 310 may display the second screen A changed (or switched) from the first screens B and C within the first area 1010. In various embodiments, displaying the second screen A may mean switching an application, associated with the second screen A switched to the background state due to switching to the second state, into the foreground state. In various embodiments, displaying the second screen A may mean ceasing writing of data associated with the first screens B and C and starting writing data associated with the second screen A in the embedded memory 335 in the display-driving circuit 330 for displaying the screen.

In various embodiments, the processor 310 may detect that the state of the electronic device 300 is changed from the second state to the first state while the second screen A is displayed within the first area 1010. While the second screen A is displayed within the first area 1010, the processor 310 may maintain the display of the second screen A within the first area 1010 and may start displaying the first screens B and C within the second area 1020 in response to detecting that the state of the electronic device 300 is changed from the second state to the first state. In various embodiments, while the second screen A is displayed within the first area 1010, the processor 310 may display the second screen A within the first area 1010 and may resume the display of the first screens B and C within the second area 1020 in response to detecting that the state of the electronic device 300 is changed from the second state to the first state.

As described above, the electronic device 300 according to various embodiments may call a screen obscured (or restricted) in the second state on the basis of intuitive user input even if multiple user interfaces (or multiple pieces of content, multiple pieces of information, or multiple windows) are provided in some areas of the entire area of the display 340. By performing calling in this way, the electronic device 300 is capable of providing an improved user experience.

Figure 11:
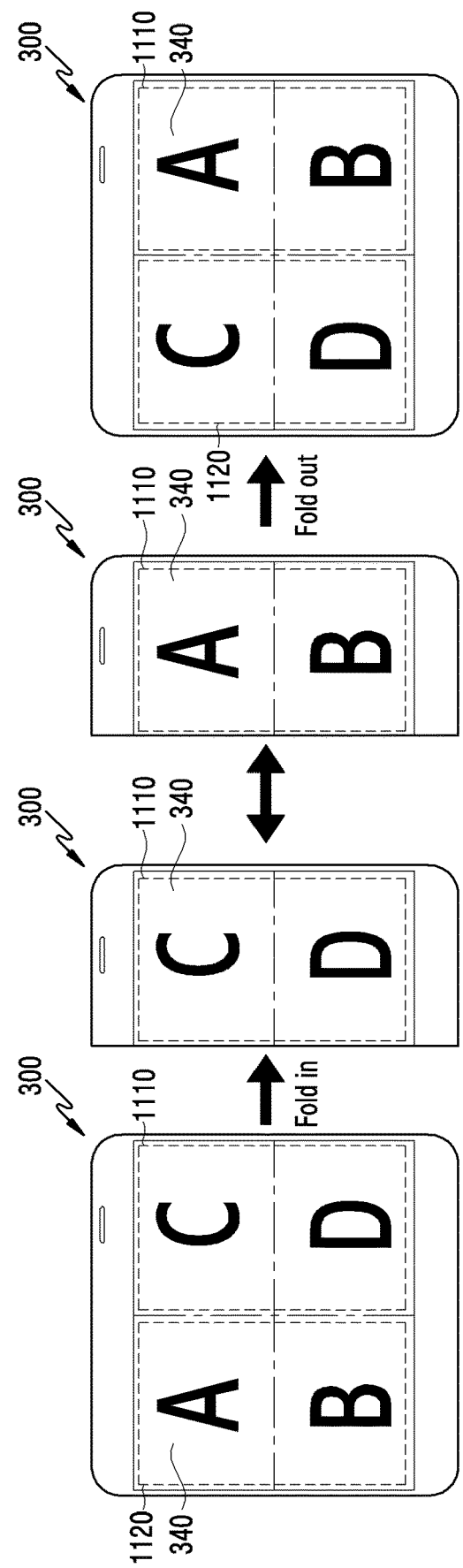
FIG. 11 illustrates another example of screen switching in an electronic device according to various embodiments.

FIG. 11 illustrates another example of screen switching in an electronic device according to various embodiments. The screen switching may be controlled by the electronic device 100 illustrated in FIG. 1, the electronic device 200 illustrated in FIG. 2, the electronic device 300 illustrated in FIG. 3A, the electronic device 400 illustrated in FIG. 4, the electronic device 500 illustrated in FIG. 5, a processor included in the electronic device 100, a processor included in the electronic device 200, a processor 310 included in the electronic device 300, a processor 410 included in the electronic device 400, or a processor 510 included in the electronic device 500.

Referring to FIG. 11, in the first state, through the display 340, the processor 310 may display first screens C and D within a first area 1110 and may display second screens A and B within a second area 1120.

In various embodiments, the processor 310 may detect that the state of the electronic device 300 is changed from the first state to the second state while the first screens C and D are displayed within the first area 1110 and the second screens A and B are displayed within the second area 1120. Although not illustrated in FIG. 11, in various embodiments, the processor 310 may cease or restrict the display of the second screens A and B within the second area 1120 in response to the detecting. Meanwhile, the processor 310 may maintain the display of the first screens C and D within the first area 1110 independently of the detection.

In various embodiments, the processor 310 may detect input for calling the second screens A and B while the display of the second screens A and B in the second area 1120 is ceased in the second state. For example, the input for calling the second screens A and B may be input to the second area 1120.

In various embodiments, in response to detecting the input, the processor 310 may display the second screens A and B changed (or switched) from the first screens C and D within the first area 1110. In various embodiments, displaying the second screens A and B may mean switching a first application, associated with one A of the second screens switched to the background state due to the switching to the second state, to the foreground state, and switching a second application, associated with the other B of the second screens switched to the background state due to the switching to the second state, to the foreground state. In various embodiments, displaying the second screens A and B may mean ceasing writing of data associated with the first screens C and D and starting writing data associated with the second screens A and B in the embedded memory 335 in the display-driving circuit 330 for displaying the screen.

In various embodiments, the processor 310 may detect that the state of the electronic device 300 is changed from the second state to the first state while the second screens A and B are displayed within the first area 1110. While the second screens A and B are displayed within the first area 1110, the processor 310 may maintain the display of the second screens A and B within the first area 1110 and may start displaying the first screens C and D within the second area 1120 in response to detecting that the state of the electronic device 300 is changed from the second state to the first state. In various embodiments, while the second screens A and B are displayed within the first area 1110, the processor 310 may display the second screens A and B within the first area 1110 and may resume the display of the first screens C and D within the second area 1120 in response to detecting that the state of the electronic device 300 is changed from the second state to the first state.

As described above, the electronic device 300 according to various embodiments may call a screen obscured (or restricted) in the second state on the basis of intuitive user input even if multiple user interfaces (or multiple pieces of content, multiple pieces of information, or multiple windows) are provided in some areas of the entire area of the display 340. By performing calling in this way, the electronic device 300 is capable of providing an improved user experience.

Figure 12:
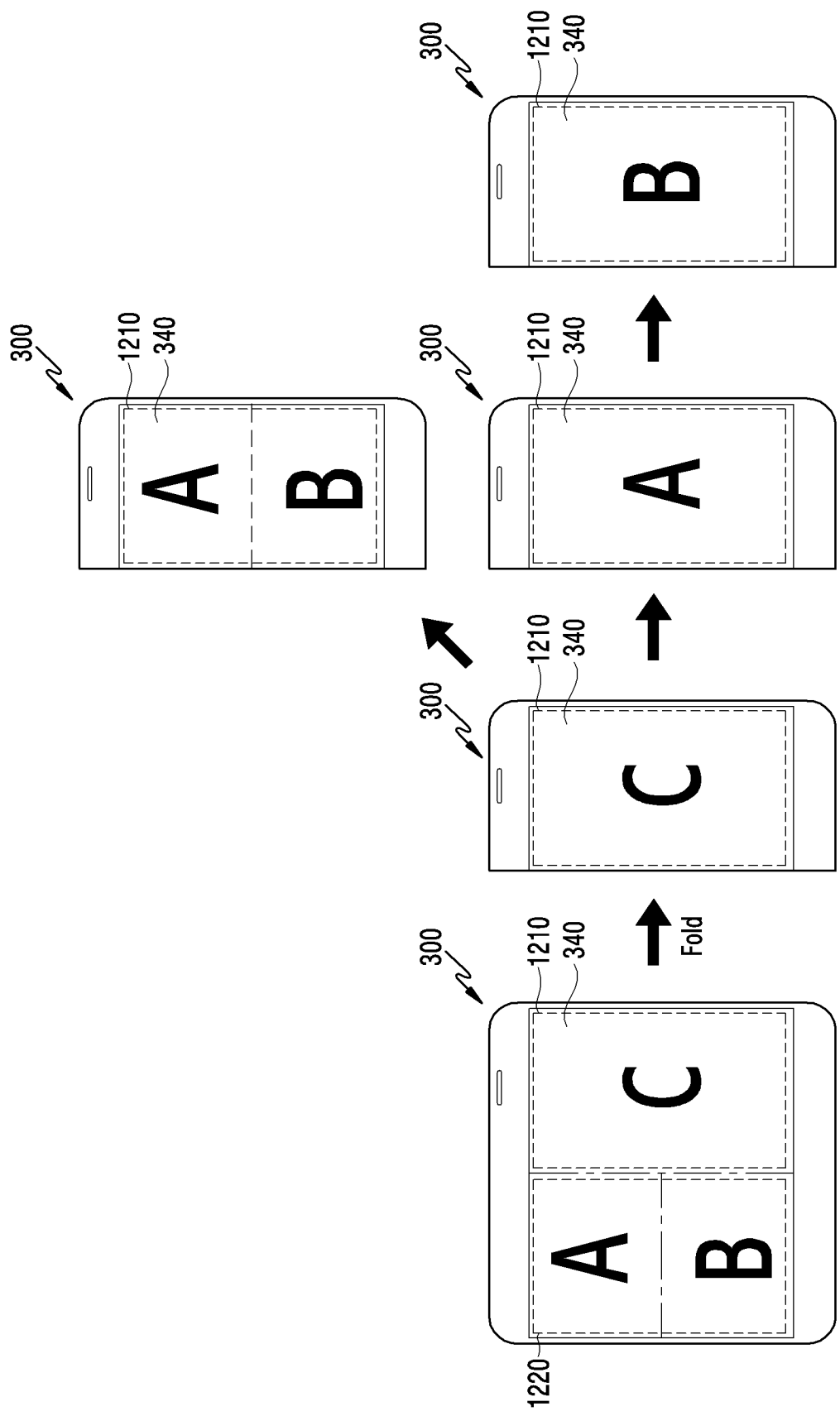
FIG. 12 illustrates another example of screen switching in an electronic device according to various embodiments.

FIG. 12 illustrates another example of screen switching in an electronic device according to various embodiments. This screen switching may be controlled by the electronic device 100 illustrated in FIG. 1, the electronic device 200 illustrated in FIG. 2, the electronic device 300 illustrated in FIG. 3A, the electronic device 400 illustrated in FIG. 4, the electronic device 500 illustrated in FIG. 5, a processor included in the electronic device 100, a processor included in the electronic device 200, a processor 310 included in the electronic device 300, a processor 410 included in the electronic device 400, or a processor 510 included in the electronic device 500.

Referring to FIG. 12, in the first state, through the display 340, the processor 310 may display a first screen C within a first area 1210 and may display second screens A and B within a second area 1220.

In various embodiments, the processor 310 may detect that the state of the electronic device 300 is switched from the first state to the second state while the first screen C is displayed within the first area 1210 and the second screens A and B are displayed within the second area 1220. Although not illustrated in FIG. 12, in various embodiments, the processor 310 may terminate the display of the second screens A and B within the second area 1220 in response to the detecting. Meanwhile, the processor 310 may continuously display the first screen C within the first area 1210 regardless of the detection.

In various embodiments, the processor 310 may detect first input for calling the second screens A and B while the second screens A and B are not displayed within the second area 1220 in the second state.

In various embodiments, in response to detecting the first input, the processor 310 may display the second screens A and B switched from the first screen C within the first area 1210. In various embodiments, the arrangement of the switched second screens A and B may correspond to the arrangement of the second screens A and B displayed within the second area 1220 in the first state.

In various embodiments, the processor 310 may detect second input for calling one of the second screens A and B while the second screens A and B in the second area 1220 are not displayed in the second state. In various embodiments, the attributes (characteristics or type) of the second input may be distinct from the attributes of the first input. For example, the first input may correspond to double-tap input to the second area 1220 in the second state, while the second input may correspond to triple-tap input to the second area 1220 in the second state. In various embodiments, the position where the second input is caused may be distinct from the position where the first input is caused. For example, the first input may be caused in the second area 1220 in the second state while the second input may be caused in the first area 1210 in the second state.

In various embodiments, in response to detecting the second input, the processor 310 may display one A of the second screens switched from the first screen C within the first area 1210. In various embodiments, one A of the second screens A and B displayed within the first area 1210 may be identified on the basis of the arrangement of the second screens A and B. For example, in response to detecting the second input, the processor 310 may display one A of the second screens arranged above the other B of the second screens. In various embodiments, one A of the second screens A and B displayed within the first area 1210 may be identified on the basis of the priority of a plurality of applications associated with the second screens A and B. For example, the processor 310 may display a portion A of the second screen related to the application having the highest priority among the plurality of applications related to the second screens A and B. However, the disclosure is not limited thereto.

In various embodiments, the arrangement of one A of the second screens displayed within the first area 1210 in the second state may be distinct from the arrangement of one A of the second screens that was displayed within the second area 1220 in the first state. For example, the processor 310 may display one A of the second screens within the first area 1210 in the second state in an arrangement different from the arrangement of one A of the second screens that was displayed within the second area 1220 in the first state on the basis of a change in the characteristics of the display area (e.g., a change in aspect ratio or a change in area).

In various embodiments, the processor 310 may detect the second input while one A of the second screens is displayed within the first area 1210 in the second state. In response to detecting the second input, the processor 310 may display the other B of the second screens switched from the one A of the second screens in the first area 1210. The arrangement of the other B of the second screens displayed within the first area 1210 in the second state may be distinct from the one B of the second screens that was displayed within the second area 1220 in the first state.

Although not illustrated in FIG. 12, in various embodiments, the processor 310 may display the first screen C switched from the other B of the second screens within the first area 1210 when the second input is detected while the other B of the second screens is displayed within the first area in the second state.

As described above, the electronic device 300 according to various embodiments may perform screen switching through various methods by variously setting input for calling a screen, the display of which is ceased due to switching to the second state. By using these various methods, the electronic device 300 may provide an improved user experience.

Figure 13:
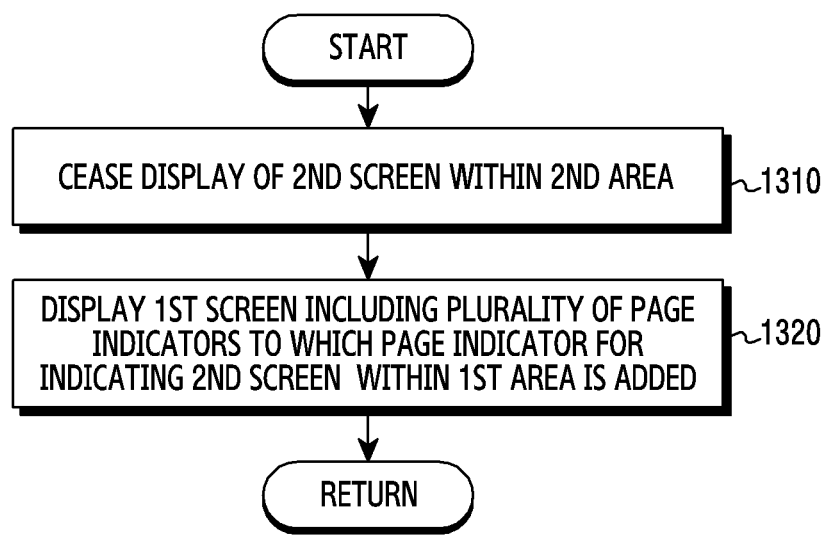
FIG. 13 illustrates exemplary operations of an electronic device that controls the display of a first screen according to various embodiments.

FIG. 13 illustrates exemplary operations of an electronic device that controls the display of a first screen according to various embodiments. These operations may be performed by the electronic device 100 illustrated in FIG. 1, the electronic device 200 illustrated in FIG. 2, the electronic device 300 illustrated in FIG. 3A, the electronic device 400 illustrated in FIG. 4, the electronic device 500 illustrated in FIG. 5, a processor included in the electronic device 100, a processor included in the electronic device 200, a processor 310 included in the electronic device 300, a processor 410 included in the electronic device 400, or a processor 510 included in the electronic device 500.

Operations 1310 and 1320 of FIG. 13 may be associated with operation 630 of FIG. 6.

Referring to FIG. 13, in operation 1310, the processor 310 may cease display of the second screen within the second area in response to identifying that the state of the electronic device 300 is changed from the first state to the second state. In various embodiments, the second screen may be a portion of a wallpaper.

Figure 14:
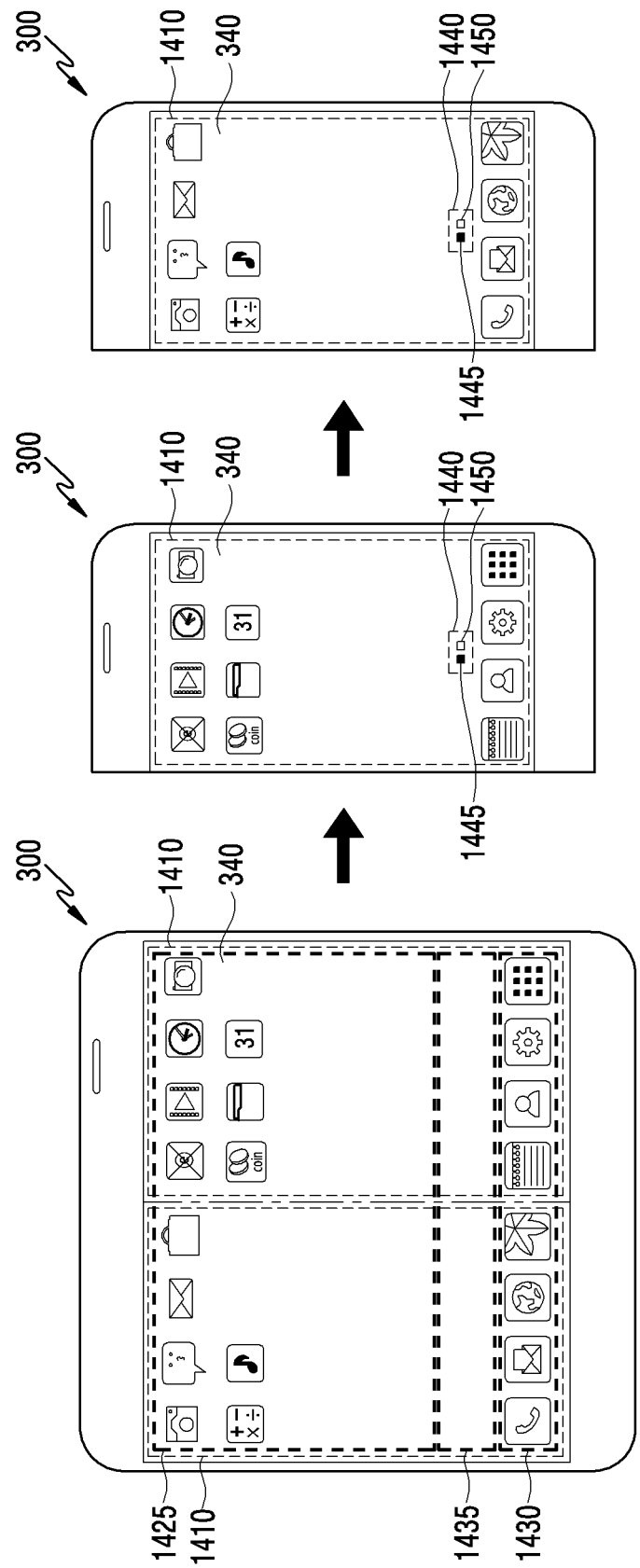
FIG. 14 illustrates an example of wallpaper switching in an electronic device according to various embodiments.

For example, referring to FIG. 14, through the display 340, the processor 310 may display a portion of the wallpaper (e.g., the first screen) within the first area 1410 and may display another portion of the wallpaper (e.g., the second screen) within the second area 1420. In various embodiments, the wallpaper may include an area 1425 in which one page among a plurality of pages can be displayed, an area 1430 maintained independently of changing the one page of the plurality of pages to another page of the plurality of pages, and an area 1435 between the area 1425 and the area 1430. In various embodiments, the one page displayed in the area 1425 may include at least one object (e.g., a widget or an icon). In various embodiments, the area 1430 may be frequently used, or may include at least one icon (e.g., top 5 icons) designed by the user. In various embodiments, the area 1435 may include a plurality of page indicators for indicating a plurality of pages, respectively. Among the plurality of page indicators, a page indicator indicating the page that is being displayed may be highlighted relative to the remaining page indicators.

In various embodiments, the processor 310 may identify that the state of the electronic device 300 is changed from the first state to the second state while a portion of the wallpaper is displayed within the first area 1410 and another portion of the wallpaper is displayed within the second area 1420. The processor 310 may cease the display of another portion of the wallpaper (e.g., the second screen) within the second area 1420 in response to the identifying.

In operation 1320, in response to the identifying, the processor 310 may display, within the first area, the first screen including a plurality of page indicators to which a page indicator for indicating the second screen is added. For example, referring to FIG. 14, in response to the identifying, the processor 310 may display a plurality of page indicators 1440 in the portion of the wallpaper (e.g., the first screen) displayed within the first area 1410. In various embodiments, among the plurality of page indicators 1440, a first page indicator 1445 may indicate a portion of the wallpaper (e.g., the first screen) that is being displayed within the first area 1410, and among the plurality of page indicators 1440, a second page indicator 1450 may indicate another portion of the wallpaper (e.g., the second screen), the display of which has been ceased, within the second area 1420. In various embodiments, among the plurality of page indicators 1440, the first page indicator 1445, indicating the portion of the wallpaper currently displayed within the first area 1410, may be highlighted relative to a second page indicator 1450, different from the first page indicator 1445 among the plurality of page indicators 1440.

In various embodiments, the processor 310 may detect input while a portion of the wallpaper is displayed within the first area 1410. The input may be input for calling another portion of the wallpaper, the display of which has been ceased within the second area 1420. The input may include tap input to the second area 1420. The input may include drag input to the first area 1410.

In various embodiments, in response to detecting the input, the processor 310 may display another portion of the wallpaper switched from the above-mentioned portion of the wallpaper within the first area 1410. In various embodiments, among the plurality of page indicators 1440, the processor 310 may highlight a second page indicator 1450 indicating the portion of the wallpaper that is currently displayed within the first area 1410 relative to the first page indicator 1445, different from the second page indicator 1450 among the plurality of page indicators 1440.

As described above, the electronic device 300 according to various embodiments may change the configuration of the wallpaper when the state of the electronic device 300 is switched from the first state to the second state while displaying the wallpaper. Through the change, the electronic device 300 according to various embodiments is capable of providing an enhanced user appearance.

Figure 15:
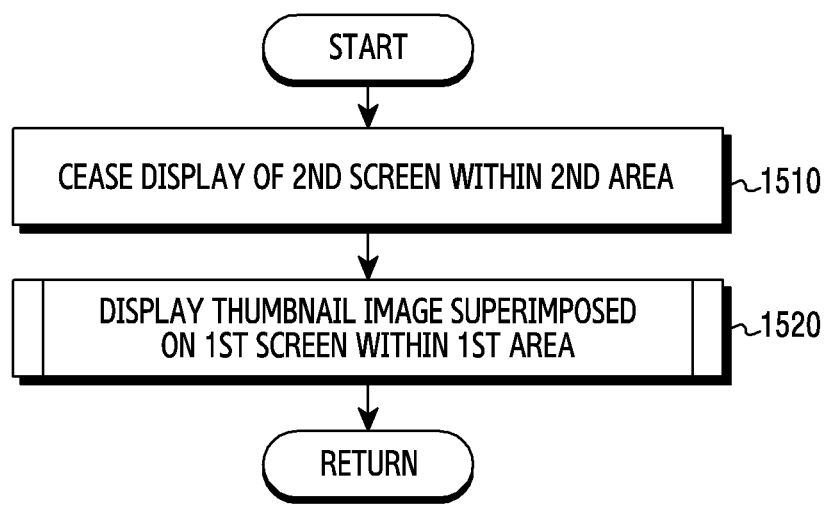
FIG. 15 illustrates exemplary operations of an electronic device that displays a thumbnail image according to various embodiments.

FIG. 15 illustrates exemplary operations of an electronic device that displays a thumbnail image according to various embodiments. These operations may be performed by the electronic device 100 illustrated in FIG. 1, the electronic device 200 illustrated in FIG. 2, the electronic device 300 illustrated in FIG. 3A, the electronic device 400 illustrated in FIG. 4, the electronic device 500 illustrated in FIG. 5, a processor included in the electronic device 100, a processor included in the electronic device 200, a processor 310 included in the electronic device 300, a processor 410 included in the electronic device 400, or a processor 510 included in the electronic device 500.

Operations 1510 to 1520 of FIG. 15 may be associated with operation 630 of FIG. 6.

Referring to FIG. 15, in operation 1510, the processor 310 may cease the display of the second screen within the second area in response to identifying that the state of the electronic device 300 is changed from the first state to the second state.

In operation 1520, in response to the identifying, the processor 310 may display a thumbnail image overlapping the first screen within the first area and representing the second screen. In various embodiments, the thumbnail image may be a reduced image of the second screen, the display of which has ceased.

Figure 16:
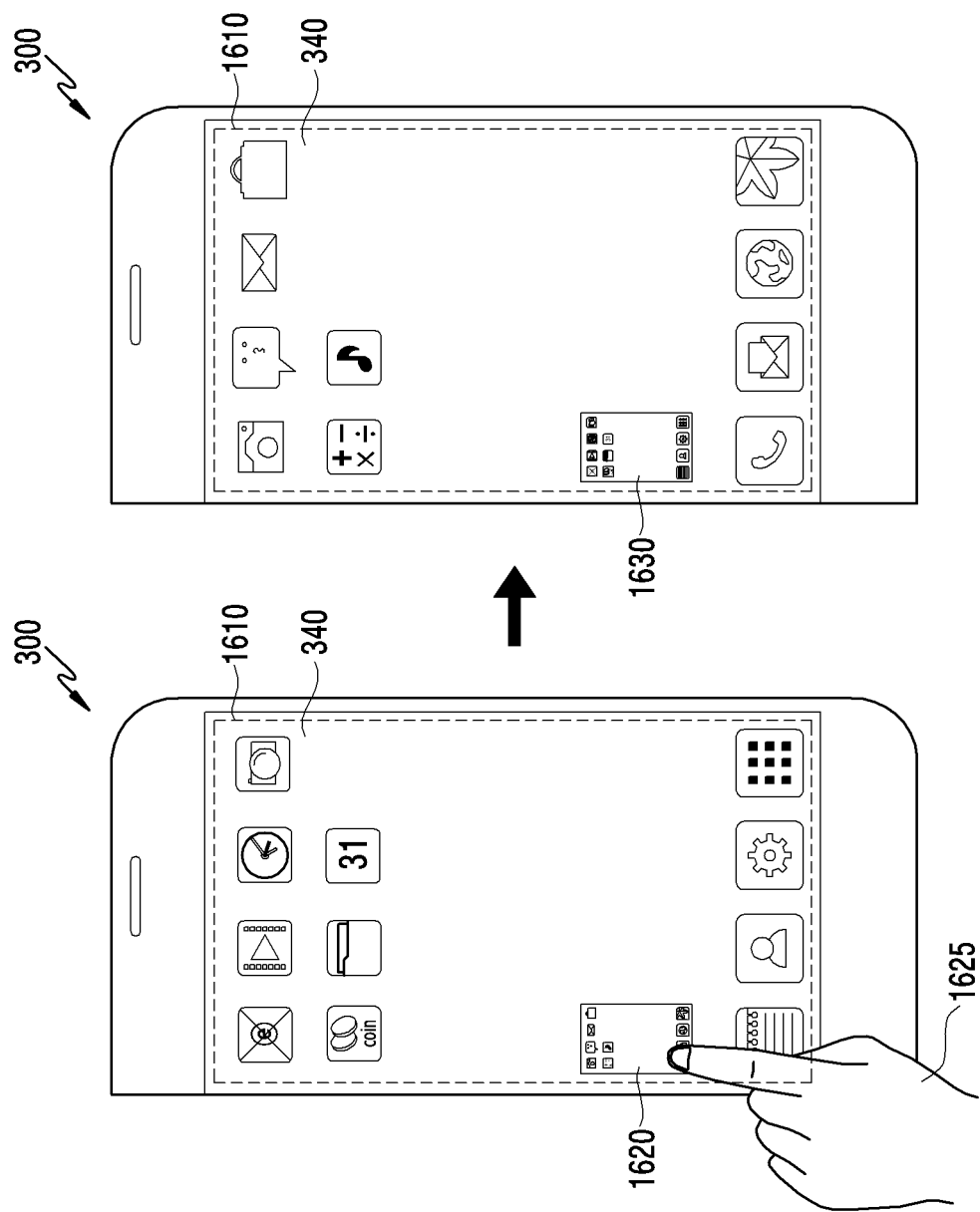
FIG. 16 illustrates an exemplary thumbnail image displayed on an electronic device according to various embodiments.

For example, referring to FIG. 16, the processor 310 may cease the display of the second screen within the second area in response to identifying that the state of the electronic device 300 is changed from the first state to the second state while the first screen is displayed within the first area 1610 and the second screen is displayed within the second area through the display 340. Meanwhile, the processor 310 may display the first screen including a thumbnail image 1620 for representing the second screen within the first area 1610 in response to the identifying. In various embodiments, the thumbnail image 1620 may be superimposed on the first screen. In various embodiments, the thumbnail image 1620 may be floated on the first screen.

Although not illustrated in FIG. 16, in various embodiments, the processor 310 may cease display of the thumbnail image 1620 while the first screen is scrolled in response to detecting input for scrolling the first screen. In various embodiments, the processor 310 may resume the display of the thumbnail image 1620 in response to detecting that the input for scrolling the first screen is terminated.

Although not illustrated in FIG. 16, in various embodiments, on the basis of drag input for moving the thumbnail image 1620, the processor 310 may display the thumbnail image 1620 moved to the position indicated by the drag input.

In various embodiments, the processor 310 may detect input 1625 on the thumbnail image 1620 while displaying the first screen through the first area 1610 in the second state. For example, the input 1625 may include tap input to the thumbnail image 1620. The processor 310 may display the second screen changed from the first screen within the first area 1610 in response to detecting the input 1625. In various embodiments, the second screen may be a screen represented by the thumbnail image 1620. In various embodiments, the second screen may further include a thumbnail image 1630 for representing the first screen, the display of which has been ceased. In various embodiments, the thumbnail image 1630 may be superimposed on the second screen. In various embodiments, the thumbnail image 1630 may be floated on the second screen.

Although not illustrated in FIG. 16, in various embodiments, the processor 310 may cease the display of the thumbnail image 1630 while the second screen is scrolled in response to detecting input for scrolling the second screen. In various embodiments, the processor 310 may resume the display of the thumbnail image 1630 in response to detecting that the input for scrolling the second screen is terminated.

Although not illustrated in FIG. 16, in various embodiments, on the basis of drag input for moving the thumbnail image 1630, the processor 310 may display the thumbnail image 1630 moved to the position indicated by the drag input.

Figure 17:
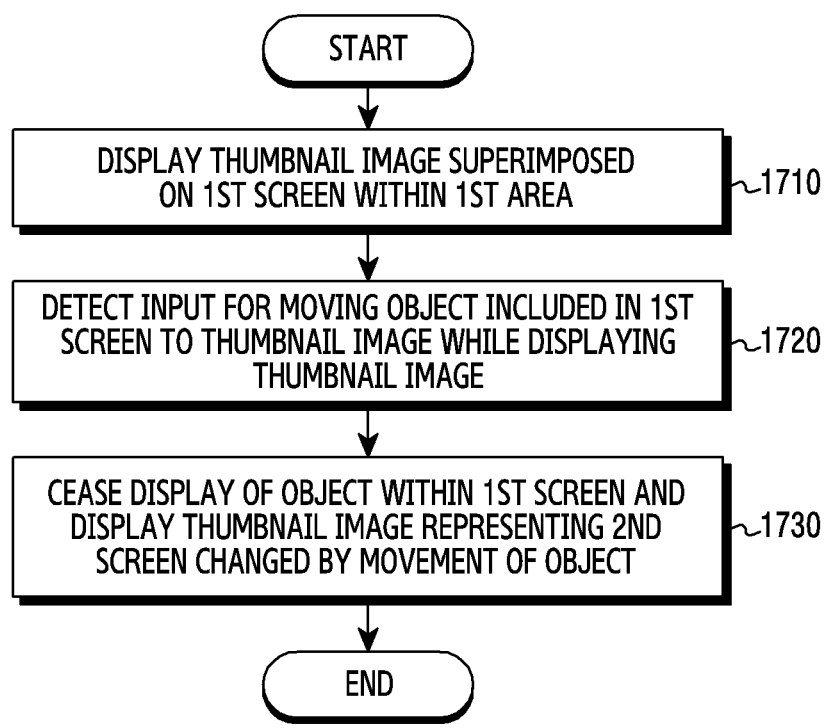
FIG. 17 illustrates exemplary operations of an electronic device that moves an object using a thumbnail image according to various embodiments.

FIG. 17 illustrates exemplary operations of an electronic device that moves an object using a thumbnail image according to various embodiments. These operations may be performed by the electronic device 100 illustrated in FIG. 1, the electronic device 200 illustrated in FIG. 2, the electronic device 300 illustrated in FIG. 3A, the electronic device 400 illustrated in FIG. 4, the electronic device 500 illustrated in FIG. 5, a processor included in the electronic device 100, a processor included in the electronic device 200, a processor 310 included in the electronic device 300, a processor 410 included in the electronic device 400, or a processor 510 included in the electronic device 500.

Operations 1710 to 1730 of FIG. 17 may be associated with operation 1520 of FIG. 15.

Referring to FIG. 17, in operation 1710, the processor 310 may display a thumbnail image superimposed on the first screen within the first area in the second state. In various embodiments, the thumbnail image may be used to represent the second screen, which is obscured due to the change to the second state. In various embodiments, each of the first screen and the second screen may be associated with a wallpaper. For example, referring to FIG. 18, the processor 310 may display a thumbnail image 1820 superimposed on the first screen within a first area 1810. In various embodiments, the thumbnail image 1820 may represent the second screen, which was displayed in the second area in the first state. In various embodiments, the first screen may correspond to a portion of the wallpaper, and the second screen may correspond to another portion of the wallpaper.

In operation 1720, the processor 310 may detect input for moving an object included in the first screen to the thumbnail image while displaying the thumbnail image. For example, referring to FIG. 18, the processor 310 may detect input 1830 for moving the object 1815 included in the first screen to the thumbnail image 1820 within the first area 1810. For example, the input 1830 may include drag-and-drop input to the object 1815.

In operation 1730, in response to detecting the input, the processor 310 may cease display of the object within the first screen, and may display a thumbnail image representing the second screen, changed by the movement of the object. For example, referring to FIG. 18, in response to detecting the input 1830, the processor 310 may terminate the display of the object 1815 on the first screen (or may delete the object 1815), and may display a thumbnail image 1840 representing the second screen, changed by the movement of the object 1815. In various embodiments, the thumbnail image 1840 may be an image changed from the thumbnail image 1820. In various embodiments, the thumbnail image 1840 may correspond to an image in which a reduced image of the object 1815 is added to the thumbnail image 1820.

Figure 18:
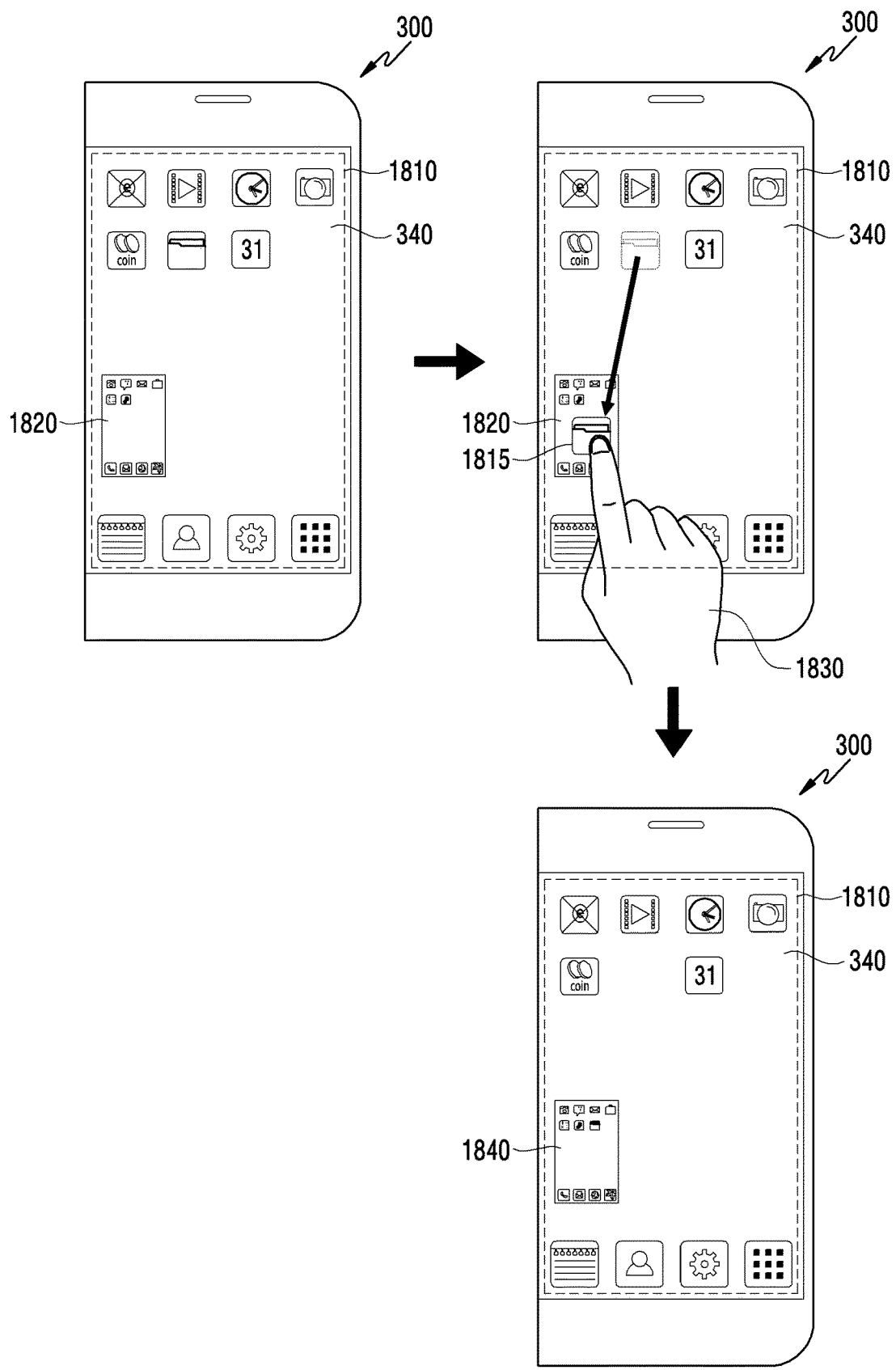
FIG. 18 illustrates an exemplary screen in which an object is moved using a thumbnail image in an electronic device according to various embodiments.

Although not illustrated in FIG. 18, in various embodiments, the processor 310 may display, within the first area 1810, the second screen to which the object 1815 is added, on the basis of detecting input to the thumbnail image 1840 or detecting input to the second area.

Although not illustrated in FIG. 18, in various embodiments, the processor 310 may display the second screen changed from the first screen within the first area 1810 when the object 1815, which is moving in response to the input 1830, is superimposed on the thumbnail image 1820 for a designated time (or when the input 1830 to the object 1815 is maintained for a designated time on the thumbnail image). When the input 1830 continues even after the change of the second screen and the input 1830 includes input for designating the position where the object 1815 is to be displayed within the second screen, the processor 310 may display the second screen including the object 1815 displayed at the position within the first area 1810.

As described above, the electronic device 300 according to various embodiments may move an object using a thumbnail image displayed by a change in the state of the electronic device 300. Through such movement, the electronic device 300 is capable of providing an improved user experience.

A method of an electronic device according to various embodiments described above may include: an operation of displaying a first screen within the first area and a second screen within the second area in the first state in which a first housing and a second housing of the electronic device are folded out about the folding part pivotably connecting the first housing and the second housing; an operation of identifying that the state of the electronic device is changed from the first state to the second state in which the first housing and the second housing are folded in about the folding part; an operation of ceasing, in response to the identifying, displaying the second screen within the second area; an operation of detecting input to the second area while the display of the second screen within the second area is ceased; and an operation of displaying, in response to the detecting, the second screen changed from the first screen within the first area.

In various embodiments, the first housing may include a first surface and a second surface that faces and is spaced apart from the first surface, the second housing may include a third surface and a fourth surface that faces and is spaced apart from the third surface, and in the second state, the second surface may be superimposed on the fourth surface.

In various embodiments, in the first state, the first surface may be substantially flush with the third surface.

In various embodiments, the operation of ceasing the display of the second screen may include an operation of ceasing display of the second screen within the second area by restricting the power provided to light-emitting elements disposed within the second area in response to the identifying.

In various embodiments, the electronic device may further include a plurality of touch sensors disposed on the flexible display, and the method may further include an operation of keeping providing power to at least one touch sensor disposed at a position corresponding to the second area among the plurality of touch sensors while the display of the second screen is ceased. In various embodiments, the operation of detecting input to the second area may include an operation of detecting input to the second area through the at least one touch sensor while the display of the second screen is ceased.

In various embodiments, the electronic device may further include a first display-driving circuit, operably connected to the flexible display of the electronic device and the processor, and a second display-driving circuit, operably connected to the flexible display and the processor, and the flexible display may further include a third area enclosing the folding part. The method may further include an operation in which the first display-driving circuit controls display of a screen within the first area and a portion of the third area, and an operation in which the second display-driving circuit controls display of a screen within the second area and another portion of the third area. In various embodiments, the first display-driving circuit may include first embedded memory, and the second display-driving circuit may include second embedded memory. The method may further include: an operation of storing first information about the first screen in the first embedded memory included in the first display-driving circuit and storing second information about the second screen in the second embedded memory included in the second display-driving circuit; an operation of displaying the first screen within the first area by scanning the first information stored in the first embedded memory using the first display-driving circuit and displaying the second screen within the second area by scanning the second information stored in the second embedded memory using the second display-driving circuit; and an operation of displaying, in response to the detecting, the second screen changed from the first screen within the first area by scanning the second information stored in the second embedded memory using the first display-driving circuit.

In various embodiments, the electronic device may further include a display-driving circuit including an embedded circuit operably connected to the processor and to the flexible display. The method may further include: an operation of storing first information about the first screen in a first designated area included in the embedded memory in the display-driving circuit; an operation of storing second information about the second screen in a second designated area included in the embedded memory in the display-driving circuit; an operation of displaying the first screen within the first area by scanning the first designated area using the display-driving circuit; an operation of displaying the second screen within the second area by scanning the second designated area using the display-driving circuit; and an operation of displaying, in response to the detecting, the second screen changed from the first screen within the first area by scanning the second designated area using the display-driving circuit.

In various embodiments, the input may include double-tap input to the second area.

In various embodiments, the first screen may correspond to a portion of a wallpaper, the second screen may correspond to another portion of a wallpaper, and the method may include an operation of ceasing, in response to the identifying, displaying the second screen within the second area, and displaying, within the first area, the first screen including a plurality of page indicators to which a page indicator for indicating the second screen is added. In various embodiments, the page indicator for indicating the second screen among the plurality of indicators may be subsequent to a page indicator for indicating the first screen among the plurality of page indicators.

In various embodiments, the method may further include an operation of ceasing, in response to the identifying, displaying the second screen within the second area, and displaying, within the first area, a thumbnail image superimposed on the first screen and representing the second screen. In various embodiments, the method may further include: an operation of detecting input on the thumbnail image while the display of the second screen is ceased; and an operation of displaying the second screen changed from the first screen within the first area in response to detecting input on the thumbnail image. In various embodiments, the method may further include an operation of ceasing display of the thumbnail image in response to detecting input for scrolling the first screen while the thumbnail image is displayed. In various embodiments, the first screen may correspond to a portion of a wallpaper, and the second screen may correspond to another portion of the wallpaper. The method may further include an operation of ceasing the display of the object within the first screen and displaying the thumbnail image representing the second screen, changed due to the movement of the object, in response to detecting input for moving an object included in the first screen to the thumbnail image while the thumbnail image is displayed.

According to various embodiments, the method may further include: an operation of detecting input for discarding the information about the second screen while the display of the second screen within the second area is ceased; an operation of discarding information about the second screen on the basis of detection of the input; an operation of detecting input on the second area after discarding the information about the second screen; and an operation of maintaining the display of the first screen within the first area even if input on the second area is detected.

A method of an electronic device according to various embodiments described above may include: an operation of displaying a first screen through the first display and a second screen through the second display in the first state in which a first housing and a second housing of the electronic device are folded out about the folding part pivotably connecting the first housing and the second housing; an operation of identifying that the state of the electronic device is changed from the first state to the second state in which the first housing and the second housing are folded in about the folding part; an operation of ceasing, in response to the identifying, displaying the second screen through the second display; an operation of detecting input to the second display while the display of the second screen through the second display is ceased; and an operation of displaying, in response to the detecting, the second screen changed from the first screen through the first display.

In various embodiments, the first housing may include a first surface and a second surface that faces and is spaced apart from the first surface, the second housing may include a third surface and a fourth surface that faces and is spaced apart from the third surface, and in the second state, the second surface may be superimposed on the fourth surface.

In various embodiments, in the first state, the first surface may be substantially flush with the third surface.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

The invention claimed is:

1. An electronic device comprising:
a first housing including a first surface and a second surface that faces and is spaced apart from the first surface;
a second housing including a third surface and a fourth surface that faces and is spaced apart from the third surface;
a folding part pivotably connecting a side surface of the first housing with a side surface of the second housing that faces the side surface of the first housing;
a flexible display disposed on the first surface and the third surface across the folding part and including a first area corresponding to the first surface and a second area corresponding to the third surface; and
a processor, wherein the processor is configured to:
display a first screen within the first area and a second screen within the second area in a first state in which the first housing and the second housing are folded out about the folding part;
identify that the electronic device is changed from the first state to a second state in which the first housing and the second housing are folded in about the folding part;
cease, in response to the identifying, displaying the second screen within the second area;
detect an input to the second area while the display of the second screen within the second area is ceased; and
display, in response to the detecting, the second screen, that was previously displayed in the second area during the identifying, instead of the first screen within the first area.

2. The electronic device of claim 1, wherein, in the second state, the second surface is superimposed on the fourth surface.

3. The electronic device of claim 1, wherein, in the first state, the first surface is substantially flush with the third surface.

4. The electronic device of claim 1, wherein the processor is configured to:
cease, in response to the identifying, displaying the second screen within the second area by restricting power provided to light-emitting elements disposed within the second area.

5. The electronic device of claim 1, further comprising:
a plurality of touch sensors disposed on the flexible display,
wherein the processor is configured to:
keep providing power to at least one touch sensor disposed at a position corresponding to the second area among the plurality of touch sensors while the display of the second screen is ceased.

6. The electronic device of claim 5, wherein the processor is further configured to:
detect the input to the second area through the at least one touch sensor while the display of the second screen is ceased.

7. The electronic device of claim 1, further comprising:
a first display-driving circuit operably connected to the flexible display and to the processor; and
a second display-driving circuit operably connected to the flexible display and the processor,
wherein the flexible display further includes a third area enclosing the folding part,
the first display-driving circuit is configured to control display of a screen within the first area and a portion of the third area, and
the second display-driving circuit is configured to control display of a screen within the second area and another portion of the third area.

8. The electronic device of claim 7, wherein the first display-driving circuit includes a first embedded memory,
the second display-driving circuit includes a second embedded memory, and
the processor is configured to:
store first information about the first screen in the first embedded memory included in the first display-driving circuit, and store second information about the second screen in the second embedded memory included in the second display-driving circuit;
display the first screen within the first area by scanning the first information stored in the first embedded memory using the first display-driving circuit, and display the second screen within the second area by scanning the second information stored in the second embedded memory using the second display-driving circuit; and
display, in response to the detecting, the second screen changed from the first screen within the first area by scanning the second information stored in the second embedded memory using the first display-driving circuit.

9. The electronic device of claim 1, further comprising:
a display-driving circuit including an embedded memory operably connected to the processor and to the flexible display,
wherein the processor is configured to:
store first information about the first screen in a first designated area included in the embedded memory in the display-driving circuit, and store second information about the second screen in a second designated area included in the embedded memory in the display-driving circuit;

display the first screen within the first area by scanning the first designated area using the display-driving circuit, and display the second screen within the second area by scanning the second designated area using the display-driving circuit; and display, in response to the detecting, the second screen changed from the first screen within the first area by scanning the second designated area using the display-driving circuit.

10. The electronic device of claim 1, wherein the input includes double-tap input to the second area.

11. The electronic device of claim 1, wherein the first screen corresponds to a portion of a wallpaper, the second screen corresponds to another portion of the wallpaper, and the processor is configured to:

cease, in response to the identifying, displaying the second screen within the second area, and display, within the first area, the first screen including a plurality of page indicators to which a page indicator for indicating the second screen is added.

12. The electronic device of claim 11, wherein the page indicator for indicating the second screen among the plurality of indicators is subsequent to a page indicator for indicating the first screen among the plurality of page indicators.

13. The electronic device of claim 1, wherein the processor is configured to:

cease, in response to the identifying, displaying the second screen within the second area, and display, within the first area, a thumbnail image superimposed on the first screen and representing the second screen.

14. The electronic device of claim 13, wherein the processor is further configured to:

detect input on the thumbnail image while the display of the second screen is ceased; and display the second screen changed from the first screen within the first area in response to the detecting of the input on the thumbnail image.

15. The electronic device of claim 13, wherein the processor is further configured to:

cease the display of the thumbnail image in response to detecting an input for scrolling the first screen while the thumbnail image is displayed.

* * * * *